US011197140B2

(12) United States Patent
El Khayat et al.

(10) Patent No.: US 11,197,140 B2
(45) Date of Patent: *Dec. 7, 2021

(54) METHODS AND DEVICES FOR CONTENT DISTRIBUTION

(71) Applicant: Telefonaktiebolaget LM Ericsson (publ), Stockholm (SE)

(72) Inventors: Ibtissam El Khayat, Glons (BE); Heiko Perkuhn, Bonn (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 252 days.

This patent is subject to a terminal disclaimer.

(21) Appl. No.: 15/610,824

(22) Filed: Jun. 1, 2017

(65) Prior Publication Data
US 2017/0272899 A1    Sep. 21, 2017

Related U.S. Application Data

(63) Continuation of application No. 13/509,886, filed as application No. PCT/EP2011/067833 on Oct. 12, 2011, now Pat. No. 9,699,592.
(Continued)

(51) Int. Cl.
*H04W 4/80* (2018.01)
*H04W 4/02* (2018.01)
(Continued)

(52) U.S. Cl.
CPC .............. *H04W 4/80* (2018.02); *H04L 67/18* (2013.01); *H04L 67/1063* (2013.01);
(Continued)

(58) Field of Classification Search
CPC ............................ H04L 67/18; H04W 4/008
See application file for complete search history.

(56) References Cited

U.S. PATENT DOCUMENTS 6,150,961 A  * 11/2000 Alewine .................. G08G 1/01
340/905
7,873,690 B2    1/2011 Neumann et al.
(Continued)

FOREIGN PATENT DOCUMENTS

CN    101364921 A    2/2009
CN    101534252 A    9/2009
(Continued)

OTHER PUBLICATIONS

Penno R. et al. "ALTO Protocol; draft-penno-alto-protocol-04.txt." Internet Engineering Task Force, IETF, Standard Working Draft, Oct. 26, 2009, pp. 1-36.
(Continued)

Primary Examiner — Muthuswamy G Manoharan
(74) Attorney, Agent, or Firm — Coats + Bennett, PLLC

(57) ABSTRACT

To control content distribution to plural mobile entities, a device for managing the distribution of the content may determine mobile entities which participate in sharing the same content and which are located in the same region. The mobile entities respectively have a first interface for communication with a mobile communication network and a second interface for forming an ad-hoc network with another mobile entity. A message indicating at least one peer address of a peer mobile entity may be selectively transmitted to a mobile entity. The peer address allows the mobile entity to retrieve at least a piece of the content over the second interface from another mobile entity.

17 Claims, 8 Drawing Sheets

Related U.S. Application Data

(60) Provisional application No. 61/488,227, filed on May 20, 2011.

(51) Int. Cl.
    *H04W 84/18*     (2009.01)
    *H04W 4/08*     (2009.01)
    *H04L 29/08*     (2006.01)

(52) U.S. Cl.
    CPC ......... *H04L 67/1072* (2013.01); *H04W 4/023* (2013.01); *H04W 4/08* (2013.01); *H04W 84/18* (2013.01)

(56) References Cited

U.S. PATENT DOCUMENTS

| | | | |
|---|---|---|---|
| 8,407,472 B2 * | 3/2013 | Hao | H04L 9/0827 455/456.1 |
| 2002/0062310 A1 | 5/2002 | Marmor et al. | |
| 2003/0221009 A1 | 11/2003 | Standridge et al. | |
| 2009/0182498 A1 | 7/2009 | Seymour | |
| 2009/0234918 A1 | 9/2009 | Neumann et al. | |
| 2010/0208896 A1 | 8/2010 | Goto | |
| 2010/0293294 A1 | 11/2010 | Hilt et al. | |
| 2011/0047248 A1 | 2/2011 | Park et al. | |
| 2011/0099228 A1 | 4/2011 | Smith | |
| 2012/0072528 A1 * | 3/2012 | Rimae | H04N 21/41407 709/217 |
| 2012/0258727 A1 | 10/2012 | Wong et al. | |
| 2012/0263102 A1 * | 10/2012 | Chen | H04W 40/20 370/328 |

FOREIGN PATENT DOCUMENTS

| | | |
|---|---|---|
| CN | 101884194 A | 11/2010 |
| CN | 101997907 A | 3/2011 |
| EP | 1333627 A1 | 8/2003 |
| WO | 2010094322 A1 | 8/2010 |
| WO | 2011050966 A1 | 5/2011 |
| WO | 2011054913 A1 | 5/2011 |
| WO | 2011087408 A1 | 7/2011 |

OTHER PUBLICATIONS

Oyman, O., et al., "Toward Enhanced Mobile Video Services over WiMAX and LTE," WiMAX/LTE Update, IEEE Communications Magazine, Aug. 2010, ISSN 0163-6804, IEEE Communications Society, pp. 68-76.

Popova, L., et al., "Cooperative mobile-to-mobile file dissemination in cellular networks within a unified radio interface," ScienceDirect, Computer Networks, v. 52, Issue 6, Apr. 24, 2008, ISSN 1389-1286, Elsevier B.V., pp. 1153-1165.

\* cited by examiner

METHODS AND DEVICES FOR CONTENT DISTRIBUTION

RELATED APPLICATIONS

This application is a continuation of U.S. application Ser. No. 13/509,886, filed Jul. 5, 2012, which was the National Stage of International Application No. PCT/EP2011/067833, filed Oct. 12, 2011, which claims the benefit of U.S. Provisional Application No. 61/488,227, filed May 20, 2011, the disclosures of each of which are incorporated herein by reference in their entirety.

TECHNICAL FIELD

The invention relates to the distribution of content to mobile entities.

BACKGROUND

The distribution of content to mobile entities over a mobile communication network is of significant interest. Delivery of media, such as audio, pictures or video has widespread applicability. Technical implementations may be based on streaming technologies or on downloading. Streaming may be live streaming or on-demand. For illustration, media delivery to vehicles is regarded as being interesting. Examples include infotainment applications, the delivery of navigation-related information, or the delivery of traffic-related information. Car infotainment includes services such as media rendering systems (Compact Disc player, mp3 player, radio), backseat entertainment like video from disk or on demand, but also traffic and navigation information. Some or several of these services may be implemented such that the content is delivered to vehicles or other mobile entities over the internet. In the context of vehicle infotainment, this development is also referred to as "Connected Car Infotainment". Audio streaming to mobile entities may be one of the first applications that will be used. A significant fraction of radio consumption happens in the car, and always being able to reach the favorite stations may be of interest to both users and service providers. At the same time, audio streaming has low driver distraction risk.

An increasing number of vehicles is expected to be equipped with both a cellular interface and at least one other communication interface. The other interfaces may include a Wi-Fi interface operative according to a standard of the IEEE 802.11 family. Certain protocols, such as IEEE 802.11p, have been standardized with special characteristics and requirements of Intelligent Transport Systems (ITS) in mind. Such protocols may be used for safety-related communication or other applications in communication between vehicles or other mobile entities.

However, even with very recent communication standards such as the 3GPP (Third Generation Partnership Project) specifications Rel. 10 (LTE Adv.), the number of mobile clients per radio cell which can be supported in content delivery over a mobile communication network may be fairly limited. For illustration, for a bit rate of 384 kb/s, approximately ten clients per radio cell may be supported with 3GPP Rel. 10. For greater bit rates, such as 1536 kb/s, the number may be even less, e.g. on the order of three. This similarly applies to other standards.

Further examples for the distribution of content to mobile entities include infotainment features, such as delivery of video or online gaming, to mobile phones or other handheld devices. When content is distributed to such devices, the radio access network of the mobile communication network may be prone to experiencing an overload situation when a large number of people located in the same area, such as a school yard, wishes to view the same movie at the same time. Similar overload situations in the radio access network may occur in any geographical area where many people are close to each other and share the same interests, which makes it likely that the same content must be distributed to them.

To increase the number of mobile entities to which content may be distributed, various approaches are conceivable. In one approach, Wi-Fi hotspots may be deployed for content delivery. A mobile entity which is in the coverage of a Wi-Fi hotspot may use the Wi-Fi connection and will be contacted through the Wi-Fi connection. If the Wi-Fi hotspot has a sufficiently great bandwidth, content may be delivered to a greater number of cars while attaining a good bit rate. However, such an approach may be very expansive and may require significant investments in infrastructure. For illustration, for hotspots deployed along a motorway, it may be estimated that approximately one access point every 500 meters would be needed.

In another approach, peer-to-peer (P2P) techniques on an uplink channel of the mobile communication network may be used. These channels may frequently be unused, for example for mobile entities which are vehicles or which are installed in vehicles. When several mobile entities request the same file, parts of the file which have already been downloaded by one of the mobile entities may be distributed to other mobile entities. A new mobile entity interested in the file does not need to use the download link, which allows a greater number of mobile entities to be served. An example for such an approach is described in L. Popova et al., "Cooperative Mobile-to-Mobile File Dissemination in Cellular Networks Within A Unified Radio Interface", Computer Networks, vol. 52, no. 6, April 2008, pp. 1153-65. In such an approach which uses the uplink channel of the mobile communication network, the distribution happens only within the area of one Base Station (BS) or Radio Network Controller (RNC), without it being easily possible to capitalize on the proximity of other cars in other radio cells. This approach also requires the BS or RNC to be modified. Further, if the distance between mobile entities is less than ten meters, this approach may have interference problems. However, in situations such as traffic jams where techniques to relieve the radio network are of particular importance, such a minimum distance may be difficult to guarantee.

SUMMARY

It is the object to alleviate or obviate at least some of the above drawbacks, and to provide improved methods and devices for distributing content to mobile entities.

According to an embodiment, a method of managing distribution of content to a mobile entity is provided. The mobile entity has a first interface for communicating with a mobile communication network and a second interface for forming an ad-hoc network with another mobile entity. A request from the mobile entity is received over the mobile communication network. The request includes a content identifier identifying the content. Based on the received request, a region is identified in which the mobile entity is located. Based on the content identifier, information on other mobile entities which participate in sharing the content is retrieved. A subset of the other mobile entities is identified based on the determined region. A message is transmitted via the mobile communication network to the mobile entity. The message includes at least one of a peer address of a peer mobile entity included in the identified subset or a source address, the peer address allowing the mobile entity to retrieve at least a piece of the content over the second interface from the peer mobile entity.

According to another embodiment, a device for managing distribution of content to a mobile entity is provided. The device comprises an interface to receive, via a mobile communication network, a request from the mobile entity, the request including a content identifier identifying the content. The device comprises a processing unit coupled to the interface and configured to determine, based on the received request, a region in which the mobile entity is located. The processing device is configured to retrieve, based on the content identifier, information on other mobile entities which participate in sharing the content. The processing device is configured to identify a subset of the other mobile entities based on the determined region. The processing device is configured to transmit, over the mobile communication network, a message to the mobile entity, which message includes at least one of a peer address of a peer mobile entity included in the identified subset or a source address, the peer address allowing the mobile entity to retrieve the content over an ad-hoc network from the peer mobile entity.

According to another embodiment, a method of retrieving content by a mobile entity is provided. The mobile entity has a first interface for communicating with a mobile communication network and a second interface for forming an ad-hoc network with another mobile entity. A request including a content identifier identifying the content is transmitted over the first interface. A message which is received over the first interface in response to the request is processed, the message including at least one of a source address or a peer address. At least a piece of the content is selectively retrieved over the second interface from another mobile entity using the peer address if the message includes the peer address.

According to another embodiment, a mobile entity is provided. The mobile entity comprises a first interface for communicating with a mobile communication network. The mobile entity comprises a second interface for forming an ad-hoc network with another mobile entity. The mobile entity comprises a controller which is configured to transmit, over the first interface, a request including a content identifier identifying content. The controller is configured to process a message received over the first interface in response to the request, the message including at least one of a source address or a peer address. The controller is configured to selectively retrieve at least a piece of the content over the second interface from another mobile entity based on the peer address if the message includes the peer address.

According to another embodiment, a system is provided which comprises a device for managing distribution of content of an embodiment and a mobile entity of an embodiment. The system may further comprise a plurality of other mobile entities which are respectively configured as a mobile entity of an embodiment. The system may further comprise a content source which delivers the content to at least one mobile entity over a mobile communication network.

According to another embodiment, a non-transitory computer-readable storage medium is provided on which instructions are stored which, when executed by a processor, direct the processor to perform a method of an embodiment.

The methods of various embodiments described herein can be implemented by at least one processor executing the computer-readable instructions. The mobile entities and network components described herein may include at least a processor and the non-transitory computer-readable storage medium.

In the methods, devices and systems of embodiments, communication between mobile entities is capitalized to increase the efficiency of content distribution. The cellular network may be relieved and/or enhanced quality of experience (QoE) may be attained. Advantage is taken of the second interface, which is present for communication between mobile entities, also for distributing content. This makes it possible that content may be shared between mobile entities located sufficiently close to each other to allow communication over the second interfaces, while the mobile entities do not need to be located in the same cell of the mobile communication network. When other mobile entities are identified based on the region in which a requesting mobile entity is located, an ad-hoc network between the requesting mobile entity and one of the other mobile entities may be used quickly for distributing the content. This makes the methods and devices suitable for use in distributing content to vehicles such as cars.

According to further embodiments, other methods, devices, systems, or computer program products for implementing the methods may be provided.

DETAILED DESCRIPTION

Figure 1:
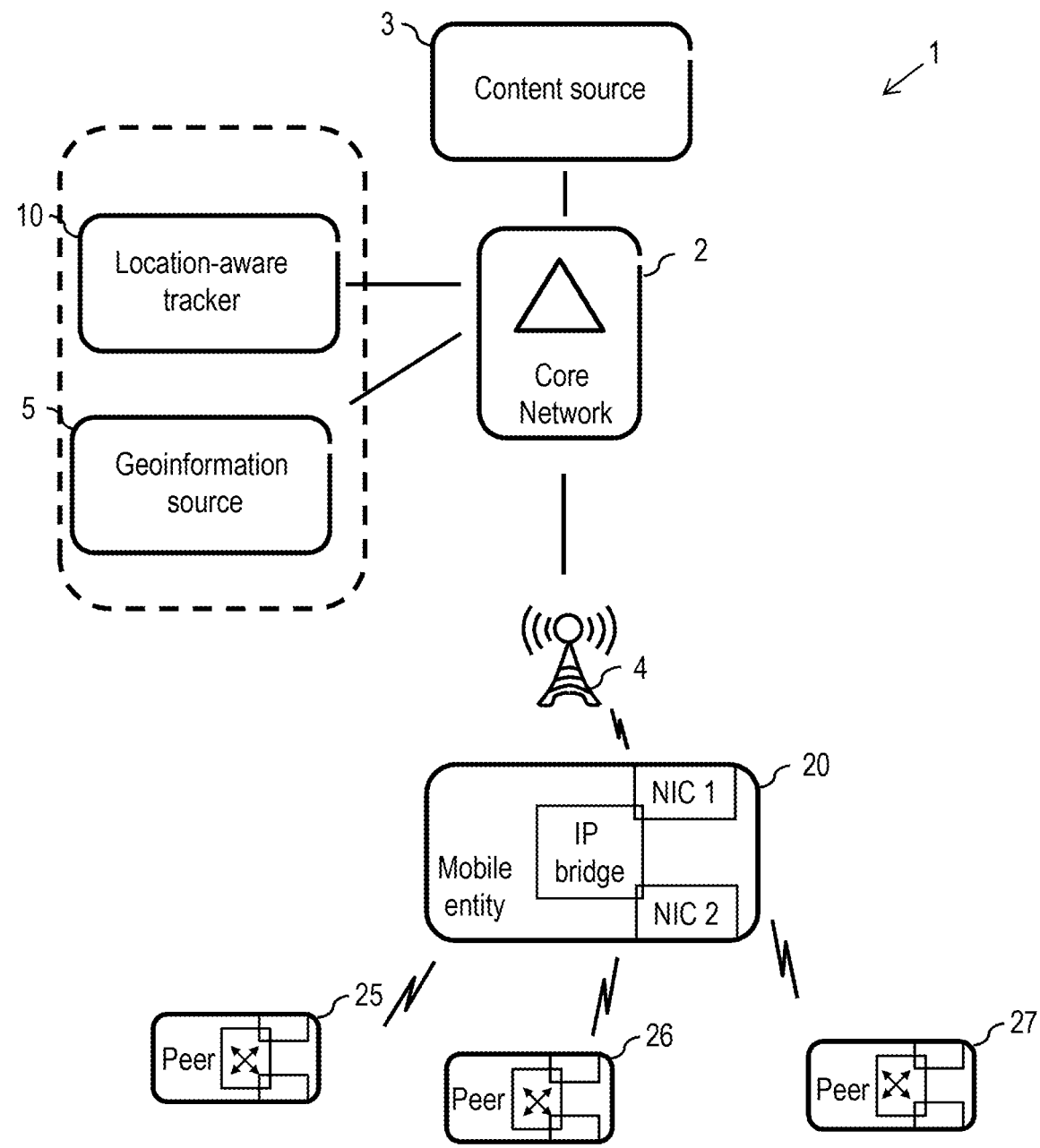
FIG. 1 is a schematic illustration of a system in which concepts according to embodiments of the invention may be implemented.

In the following, the invention will be explained in more detail with reference to exemplary embodiments and to the accompanying drawings in which identical or corresponding reference numerals designate identical or corresponding entities. The illustrated embodiments relate to concepts of distributing content to a mobile entity. Examples for such content delivery include audio streaming, video streaming, or other media streaming. The streaming may be live or on-demand. Additional examples include the delivery of media, such as audio, video or other media, for download. Some embodiments and the entities used therein may be described in the context of mobile communication networks operative according to a given standard, such as the 3GPP (Third Generation Partnership Project) Technical Specifications (TSs). It is to be understood that the illustrated concepts may be applied in other types of communication networks as well. Some embodiments and the entities used therein may be described in the context of mobile entities which are vehicles, which form a vehicular ad-hoc network (VANET). It is to be understood that the illustrated concepts may be applied for distributing content to other types of mobile entities as well.

According to embodiments, media distribution takes advantage of peer-to-peer (P2P) communication. Mobile entities interested in the same content may share pieces of the content already downloaded to one of the mobile entities. A mobile ad-hoc network (MANET) may be formed between mobile entities which are sufficiently close to communicate over the second interfaces. According to general terminology, P2P is used to refer to a technology of distributing content in such a way that receivers of the content re-distribute it as well. An example for a P2P protocol is Bittorrent. According to general terminology, ad-hoc networks are infrastructure-less networks in which clients are only connected among each other and not to any "Access Point". Standards describing mobile ad-hoc networks include, e.g., IEEE 802.11 and IEEE 802.15. A protocol for P2P communication specifically developed with a view to vehicular applications is the IEEE 802.11p protocol family. The mobile ad-hoc P2P networks may be based on any technology, such as IEEE 802.11, IEEE 802.15, Bluetooth, ZigBee or any other technology used for ad-hoc P2P communication. The concepts of the invention may be used with any one of these technologies, i.e., the concepts are operative irrespective of the specific technical implementation of the mobile ad-hoc P2P network.

According to embodiments, location information of mobile entities which are located in proximity to each other is utilized. Such information may be used to perform a location-dependent filtering to identify other mobile entities which share the same content and are located in the same area as a requesting mobile entity. Geo information of the mobile entities may be combined with information on the content which various mobile entities are willing to share to perform such a location-dependent filtering. As used herein, the term geo information refers to aggregated position information of mobile entities. The geo information does not need to include information on the exact coordinates of the mobile entities. As will be described in more detail, the concept of various embodiments takes advantage of information on whether a specific device resides within a certain region, but does not require the exact geo coordinates of the mobile entities to be known.

Mobile entities which participate in the methods of embodiments are equipped with a first interface for communication with a mobile communication network and a second interface for communication with other mobile entities. A mobile entity interested in a specific content may retrieve pieces of that content over the mobile communication network, the pieces of the content being received at the first interface. The mobile entity may re-distribute the received pieces of the content over the second interface to other mobile entities located in the same region as the mobile entity. Alternatively or additionally, the mobile entity may receive pieces of the content over the second interface from other mobile entities located in the same region as the mobile entity. The distribution of the media is based on a P2P mechanism. The mobile entity may form an ad-hoc network with the other mobile entities, the ad-hoc network being an ad-hoc P2P network. The ad-hoc P2P network may be implemented in any one of a variety of technologies. The disclosed concepts are not limited to a specific implementation of the ad-hoc P2P network and the protocols used therein.

To assist the mobile entity in using the ad-hoc network to retrieve or redistribute content, such as media for infotainment purposes, a device for managing distribution of content informs the mobile entity of other mobile entities which are located in the same region and participate in sharing the same content. The device for managing distribution of content is located on the network side. The device for managing distribution of content may perform a location-based filtering on a list of mobile entities which participate in sharing the same content, to identify a subset of these mobile entities which are located in the same region. Thereby, account may be taken of the fact that not all mobile entities sharing the same content are reachable for the mobile entity in communication over the second interface. This is in contrast to conventional file sharing techniques such as Bittorrent, where all clients sharing the same content are assumed to be reachable at any time.

The device for managing distribution of content may manage two addresses per mobile entity. A first address of a mobile entity may be assigned to its first interface, used for communication in the mobile communication network. The first address may be an Internet Protocol (IP) address of the NIC of the first interface. The second address may be a MAC address of the NIC of the second interface. The second address may be an IP address of the NIC of the second interface. The second address may be any information which allows a mobile entity to be identified in an ad-hoc network. The device for managing distribution of content may transmit a message to the mobile entity, which message indicates the second addresses of other mobile entities located in the same region and sharing the same content.

The mobile entity may use P2P communication in an ad-hoc network to retrieve at least pieces of requested content from other mobile entities. However, the mobile entity receives information on the other mobile entities located in the same region and sharing the same content over the first interface, i.e. via the mobile communication network. The mobile entity is thereby aided in using the ad-hoc network quickly for retrieving or redistributing the content. Further, good privacy is attained. A mobile entity is informed of the IP addresses which other mobile entities use in an ad-hoc network. This does not require sensitive information, such as the identifiers of the mobile entities used in communication with the mobile communication network, to be provided to other mobile entities.

The regions used in the present concept may include plural cells of the mobile communication network. The regions may be the same or otherwise related to zones used for other services, such as a geo cast service. For illustration, the regions used for identifying mobile entities which are in proximity to each other may include several tiles of a geo cast service. A region may be identified as a union of a certain number of adjacent cells of the mobile communication network. Regions may overlap. A cell may belong to different regions. This allows the MANET to extend across boundaries of cells. The use of the ad-hoc network in distributing content to a mobile entity is no longer limited to a cell which is under the control of one RNC or BS.

P2P communication in an ad-hoc network may be selectively used for distributing the content based on whether a stable MANET may be formed. For illustration, for mobile entities which are vehicles, P2P communication in a VANET may be selectively used for distributing the content only if a stable VANET can be formed. The density of mobile entities in a region may be used by the device for managing distribution of content to determine whether a stable VANET may be formed. For illustration, the density of mobile entities in a region may be compared to a threshold. The threshold may be selected based on a characteristic communication range for communication over the second interface. If the density of mobile entities in a region is too low to form a stable VANET, a requesting mobile entity located in that region may be served over the mobile communication network. The content may be delivered to the mobile entity from a server over the mobile communication network, without being redistributed by another mobile entity. It will be appreciated that situations in which a stable MANET can be formed and content may be distributed by P2P communication in an ad-hoc network are the situations in which there is a particularly strong need to alleviate the load in the mobile communication network. For illustration, if the density of vehicles on a motorway is high, e.g. in a traffic jam, a stable VANET may likely be formed. This allows content to be delivered to a greater number of vehicles, as load in the mobile communication network can reduced by taking advantage of the P2P communication, which uses the second interfaces of vehicles.

FIG. 1 illustrates a system 1 in which concepts of embodiments may be implemented. The system includes plural mobile entities 20, 25-27, a mobile communication network and at least one content source 3.

A first mobile entity 20 has a first interface for wireless communication with the mobile communication network. The first mobile entity 20 has a second interface for wireless communication with second mobile entities 25-27. Each one of the second mobile entities respectively also has a first interface for wireless communication with the mobile communication network and a second interface for wireless communication among the mobile entities.

Content may be delivered to the first mobile entity 20 over the mobile communication network. The mobile communication network includes a RNC or BS or EnodeB 4. Other implementations of the radio network of the mobile communication network may be used according to other standards and technologies. The mobile communication network also includes a core network 2 coupled to the RNC 4 or BS 4 or EnodeB 4. The core network 2 may include a node for delivering the content over the mobile communication network to mobile entities. The node may include a GGSN (Gateway GPRS Support Node). Other nodes may be used in other network technologies. For illustration, the node in the core network 2 may be a PDN (Packet Data Network) Gateway which provides connectivity between a client and external packet data networks, via an EnodeB. The mobile communication network may be configured for operation according to LTE (Long Term Evolution). The mobile communication network may have a core network architecture which is the SAE (System Architecture Evolution) of LTE.

The mobile communication network and the first interface of the plural mobile entities 20, 25-27 may be operative in accordance with any one of a variety of communication standards. For illustration, the plural mobile entities may be equipped with mobile network access according to at least one of the 2G (Second Generation) or 3G (Third Generation) standards, or according to the LTE (Long Term Evolution) standard. The concepts of the various embodiments described herein are not limited to one of these specific technical implementations.

The content source 3 may provide the content which is to be distributed. The content may be stored in a sequence of files which may be successively transmitted to a mobile entity requesting the respective content. Various technologies may be used, such as live streaming, streaming on demand, or download. The concepts of the various embodiments described herein are not limited to one of these specific technical implementations.

When the first mobile entity 20 requests content to be delivered, the content may be provided to the first mobile entity 20 over the mobile communication network or over an ad-hoc network formed with the second mobile entities 25-27. One of the plural mobile entities 20, 25-27 located in the same region, or more than one of the plural mobile entities, will serve as sort of "head end" for the MANET which is formed between the plural mobile entities 20, 25-27. For illustration, it may be assumed that the first mobile entity 20 will stay connected with the mobile communication network and will thus serve as a head end of the MANET. Content may be delivered to the first mobile entity 20 over the mobile communication network.

When one of the second mobile entities 25-27 requests the same content to be delivered, it may send a corresponding request over the mobile communication network. According to embodiments, the request is transmitted to a device for managing distribution of content. The device for managing distribution of content may be a server which is coupled to a node of the mobile communication network. The device for managing distribution of content may be a location-aware tracker 10, which will be explained in more detail in the following. The location-aware tracker 10 is a P2P tracker, which is configured to provide information on groups of mobile entities which are interested in the same content and are willing to share that content among each other. The location-aware tracker 10 sends only pre-filtered information about neighboring peers to requesting clients. The filtering is based on geo location information. Thereby, a requesting mobile device can be informed of other mobile entities located in the same region and sharing the same content. The limited operation range attained over the second interface may thereby be accounted for.

For illustration, assuming that the second mobile entity 25 requests the same content as was previously requested by the first mobile entity 20, the request will be received by the location-aware tracker 10. The location-aware tracker 10 may store, or may be configured to retrieve, data indicating that the first mobile entity 20 already retrieved at least pieces of the same content. The location-aware tracker 10 may also store, or may be configured to retrieve, the second address of the mobile entity 20, i.e. the address used in the MANET. If another second mobile entity 26 or 27 participates in sharing the same content, the location-aware tracker 10 may store, or may be configured to retrieve, the second addresses of the other mobile entity 26 or 27. Based on information on a region in which the second mobile entity 25 is located, the location-aware tracker 10 may identify mobile entities which participate in sharing the same content and which are located in the same region as the requesting, second mobile entity 25. The location-aware tracker 10 performs a pre-filtering in the list of mobile entities which participate in sharing the same content, thereby identifying a subset of the list. The subset corresponds to mobile entities which participate in sharing the content and which are located in the same region.

In response to the request, the second mobile entity 25 may receive a message from the location-aware tracker 10. The message is transmitted over the mobile communication network. The message may indicate second addresses which are used by the other mobile entities for communication in an ad-hoc network. The message may indicate IP addresses used by the other mobile entities for communication in the ad-hoc network. The message may be a tracker answer, e.g. a Bittorrent tracker answer, indicating the IP address(es) of at least one other mobile entity which is located in the same region as the requesting mobile entity and which shares the content requested by the requesting mobile entity. If the IP address of at least one other mobile entity is included in the message, a source address of the content source 3 may additionally also be included in the message. The source address of the content source 3 may be used to retrieve content from the content source 3 over the mobile communication network, for example in a fallback procedure. The fallback procedure may be activated when content cannot be retrieved from other mobile entities. At least one of the mobile entities located in the same region may use the source address of the content source 3 to retrieve content therefrom, and to then redistribute the content. Another source address may be used, e.g. the addresses of peer entities which can be contacted over the mobile communication network to retrieve the content.

In response to receiving a message which indicates a second address of another mobile entity, e.g. of the first mobile entity 20, the requesting, second mobile entity 25 may start retrieving at least pieces of the requested content from the first mobile entity 20. It may be assumed that a MANET has already been established for other reasons, e.g. to exchange safety-related messages. If this is not the case, the mobile entities 20, 25-27 may set up the ad-hoc network. This may be done before a request is transmitted over the mobile communication network to the location-aware tracker 10.

A similar operation may be used when another one of the mobile entities transmits a request to the location-aware tracker. For illustration, when the first mobile entity 20 requests content to be delivered, it may receive second addresses of the second mobile entities 25-27 located in the same region as the first mobile entity 20. The first mobile entity 20 may use the second addresses, which are the addresses used for communication in the local ad-hoc network, to receive or redistribute the content in P2P communication over the local ad-hoc network.

The location-aware tracker 10 may provide the second addresses of other mobile entities located in the second region selectively only if there are enough mobile entities in the region to support a stable ad-hoc network. If there are not enough mobile entities in the region to form a stable ad-hoc network, the location-aware tracker 10 may send the message to the requesting mobile entity which includes a seed address in the network, i.e. an address of the content source 3. In this case, in response to receiving the message, the requesting mobile entity will retrieve the content from the content source 3, over the mobile communication network. Alternatively or additionally, the message transmitted by the location-aware tracker 10 may include an identifier for a peer entity or identifiers for plural peer entities, which may be used by the requesting mobile entity to retrieve the content over the mobile communication network from the peer entity or peer entities.

If an ad-hoc network is used in distributing the content, at least one of the plural mobile entities 20, 25-27 located in the same region may retrieve at least pieces of the content over the ad-hoc network. Nevertheless, information about neighbors that may serve as potential peers is communicated via the first interface.

The location-aware tracker 10 may perform filtering of potential peers based on the regions in which they are located according to a variety of ways. For illustration, in some implementations, a mobile entity which requests content may respectively include geo location information in the request. The location-aware tracker 10 may store this geo location information. The geo location information may be used to identify in which one of plural pre-defined regions the requesting mobile entity is located. In another implementation, the request transmitted to the location-aware tracker 10 may include an identifier for the requesting mobile entity, but does not need to include geo location information for the requesting mobile entity. In this case, the location-aware tracker 10 may access a data base to determine in which region the requesting mobile entity is located. The data base may be stored locally at the location-aware tracker 10. For illustration, if the location-aware tracker 10 also operates as a geo cast server, the location-aware tracker may have a local data base storing location information for plural mobile entities. The location-aware tracker 10 may also have an interface to retrieve geo location information of clients. For illustration, the location-aware tracker 10 may retrieve geo location information on a requesting client from a geo information source 5. The geo information source 5 may be a geo cast server which stores information on regions in which the various mobile entities are located. An exemplary implementation of such a geo information source 5 is a geo location enabler, which enables geo cast messages to be sent to clients located in a specific tile. The tiles may have an arbitrary shape. The tiles may, but do not need, to form a regular tiling. Each tile may be defined as a union of plural cells of the mobile communication network.

In a system operative as explained with reference to FIG. 1, the mobile entities may have any one of a variety of configurations. For illustration, some or all of the mobile entities may be vehicles. Some or all of the mobile entities may be cars. Each vehicle may be equipped with a mobile network access (e.g. 2G, 3G, LTE), as well as with a second interface. The second interface may be a Wi-Fi interface. The second interface may be operative for communication according to a standard of the IEEE 802.11 family, but may use other wireless technologies. Information about neighbors that may serve as potential peers for communication over the second interface is then communicated via the car's mobile network access, which may be operative in accordance with GPRS (General Packet Radio Service), UMTS (Universal Mobile Telecommunications System), HSPA (High Speed Packet Access), or LTE, for example.

In one scenario, media distribution for car infotainment purposes, such as navigation data, audio or video streams, other live or on-demand media streams or the delivery of content for download, may be based on the mechanisms described herein. P2P mechanisms, such as Bittorrent, may be used in distributing the content. Every client in a connected car represents a potential peer in the local P2P network. According to P2P protocols, clients may frequently ask for updates on the peer list. A car that started the reception of content via its mobile access may continue to receive that content via other peers in a seamless fashion from a certain point in time on. For illustration, it is possible for a vehicle to switch over from a state in which content is received over the mobile communication network to another state in which the content continues to be received, but from other cars located in the same region. Such a transition may be made when enough peers are in the region to form a stable VANET. The transition may be performed when the location-aware tracker 10, in response to receiving a request for content, transmits a message to the requesting mobile entity which includes the second addresses of other mobile entities located in the same region. When the location-aware tracker is used for managing distribution of content to vehicles, it may also be referred to as an ITS (Intelligent Transportation System) tracker. Once a stable MANET or VANET has been formed, a further mobile entity which also is interested in receiving the same content does not need to contact the location-aware tracker 10, but may join the MANET or VANET. For illustration, the further mobile entity may contact a first mobile entity which is located in the same region, shares the same content and already is in an ad-hoc P2P network, to retrieve the ad-hoc address of the first mobile entity. The further mobile entity may retrieve pieces of the content from the first mobile entity. The request sent by the further mobile entity to the first mobile entity, over the second interface, informs the first mobile entity that the further mobile entity participates in sharing the same content and is located in the same region as the first mobile entity.

The location-aware tracker 10 is operative to send only pre-filtered information about neighboring peers to requesting mobile entities. The filtering may be based on geo location information provided by the mobile entities, which act as end devices, or via a geo cast enabler. The location-aware tracker 10 is operative to align the geo information with the list of all peers which globally ask for the specific content, so that a new peer can join the VANET very quickly or the VANET can be established very quickly, respectively.

The concepts illustrated in connection with the system 1 address the problem of mobile communication networks becoming congested due to multimedia content consumed by car infotainment systems, such as audio streaming, video streaming and downloading of media, but also navigation data like real-world pictures. To this end, the distribution of the content is supported by a VANET or another MANET.

The system 1 may include additional devices. For illustration, the system 1 may comprise a portal. The portal may be operated by a service provider which offers content over the content source 3. The portal may also perform certain functions in distributing content. For illustration, the portal may return a manifest file indicating the address of the location-aware tracker, when a mobile entity contacts the service provider's portal. In the context of media for navigation purposes, a navigation device installed in a vehicle may act as a mobile entity. The navigation device may issue a request for a real-world image, when the navigation device allows such real-word images to be shown. The request may reach a navigation portal. The portal may return a manifest file or a content description file to the mobile entity which indicates the location-aware tracker. The mobile entity may then contact the location-aware tracker, resulting in an operation as described for the system 1 above.

Figure 2:
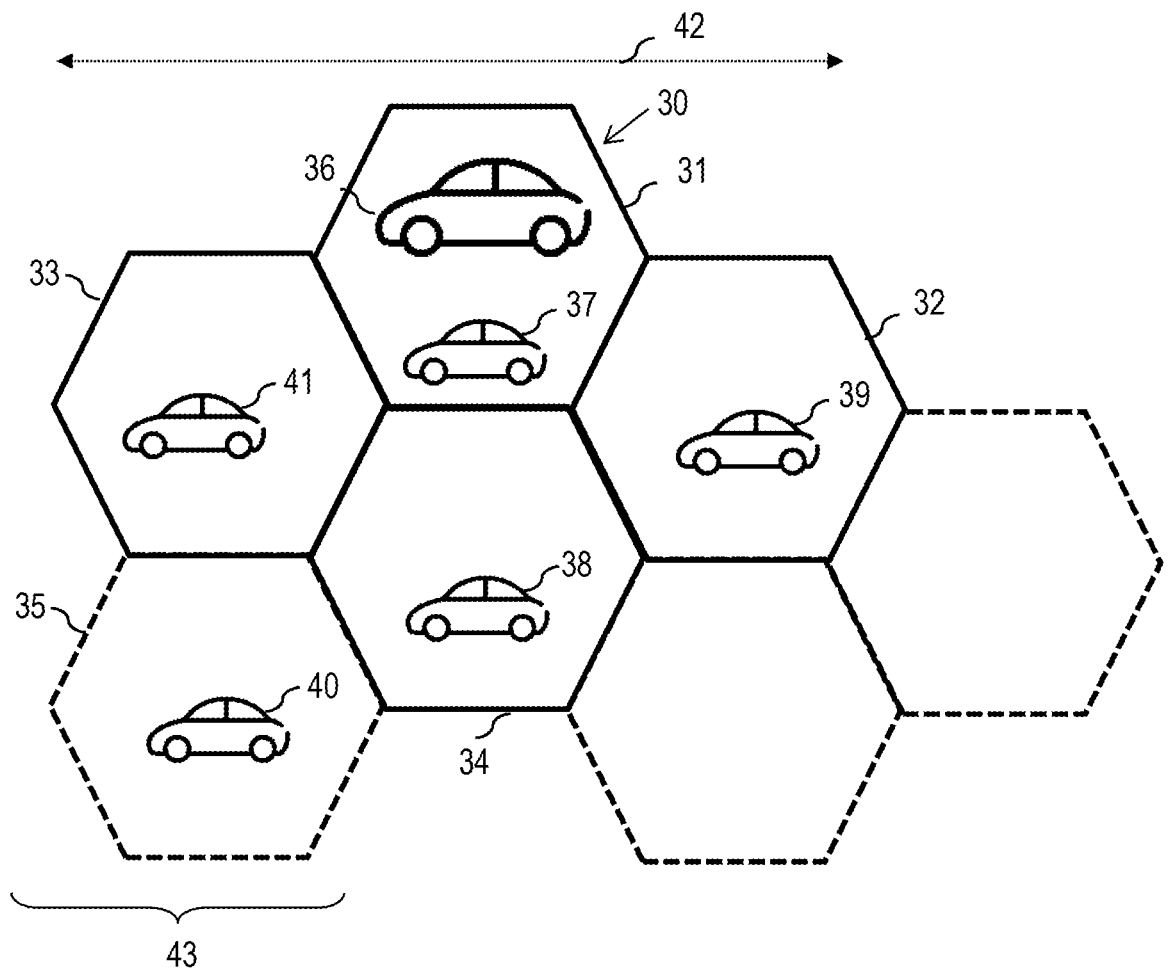
FIG. 2 is a schematic representation of mobile entities to which content is distributed in accordance with embodiments.

FIG. 2 is a schematic representation of mobile entities 36-41 to which content is distributed in accordance with embodiments.

The mobile entities respectively have a first interface for communication with a mobile communication network. The radio network of the mobile communication network has cells 31-35. Regions may be defined which comprise respectively one or plural cells. Regions may be defined which comprise portions of one or plural cells. For illustration, a region 30 may comprise a union of the cells 31-34. The defined regions do not need to be disjoint. For illustration, another region 43 may be defined to comprise a first cell 35 and second cell 33. The second cell 33 is contained both in region 30 and in the other region 43.

An ad-hoc network may be selectively used in the distribution of content when the density of mobile entities exceeds a threshold. For illustration, a number or density of mobile entities in the region 30 may be compared to a threshold to determine whether a mobile entity is to retrieve content from the content source 3 via the mobile communication network, or whether the ad-hoc network between the mobile entities is to be used for distributing the content. If the density of mobile entities is compared to a density threshold, the density threshold may depend on an operation range of the communication technology which is used to communicate over the second interface. If the number of mobile entities is compared to a number threshold, the number threshold may depend on an operation range of the communication technology which is used to communicate over the second interface, and on a dimension 42 of the region 30 in question. The dimension 42 may be a characteristic diameter of the region 30. The dimension 42 may, but does not need to indicate a length or area. For illustration, the number of cells which is contained in the region 30 may also be used as dimension 42 in the threshold comparison.

When an ad-hoc network between some of the mobile entities 36-39, 41 located in the region 30 is used to distribute the content, the ad-hoc network may extend across plural cells 31-34. For illustration, some mobile entities 36-38 and 41 may participate in sharing content according to a P2P mechanism. The content is transmitted over the second interfaces of the respective mobile entities 36-38 and 41. The wireless transmission of the content in the ad-hoc network is not limited to being performed within one cell of the mobile communication network only. The location-aware tracker 10 may inform a mobile entity 36 of the addresses used by the other mobile entities 37, 38 and 41 in communication in the ad-hoc network. The mobile entity 36 may thereby be directed to retrieve content from one or several of these other mobile entities 37, 38 and 41 over the ad-hoc network, even if the other mobile entity is located in another cell of the mobile communication network. Similarly, the mobile entity 36 may be directed to redistribute content to one or several of these other mobile entities 37, 38 and 41 over the ad-hoc network, even if the other mobile entity is located in another cell.

Not all of the mobile entities 36-41 may be willing and/or configured to participate in sharing content over an ad-hoc network. The location-aware tracker 10 may perform a two-stage comparison when determining whether an ad-hoc network is to be used in the distribution of content. In a first stage, the total number of mobile entities located in the region 30 may be compared to a first threshold. Based on a result of the first stage comparison, the requesting mobile entity may be directed to retrieve the requested content from the content source 3, via the mobile communication network, or further processing may be performed by the location-aware tracker 10. In this further processing, the number of mobile entities located in the region 30 which are willing and/or configured to share the specific content may be compared to a second threshold. Based on a result of the second stage comparison, the requesting mobile entity may be directed to retrieve the requested content from the content source 3, via the mobile communication network, or the requesting mobile entity will be directed to participate in the distribution of content over an ad-hoc network. Such a procedure reduces processing load at the location-aware tracker 10 and/or data traffic, when the total number of mobile entities contained in a region already indicates that a stable MANET is unlikely to be established.

Figure 3:
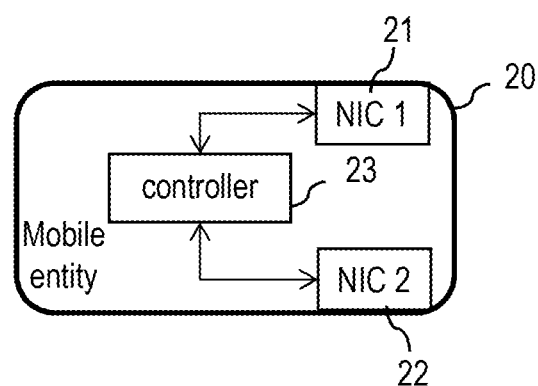
FIG. 3 is a block diagram of a mobile entity of an embodiment.

FIG. 3 is a schematic block diagram representation of a mobile entity 20. The mobile entity 20 may be a vehicle, such as a car, or may be installed in a vehicle. For illustration, the mobile entity 20 may be a navigation device of a vehicle. The mobile entity 20 may alternatively or additionally be an infotainment system of a vehicle. The mobile entity 20 may be used in the system 1.

The mobile entity 20 comprises a first interface having a first NIC 21 and a second interface having a second NIC 22. A controller 23 is coupled to the first NIC 21 and the second NIC 22 which is different from the first NIC 21. The first NIC 21 may be configured for communication according to any one of a variety of standards, e.g. a standard of the 2G, 3G, GPRS, UMTS, HSPA or LTE standard family. The second NIC 22 may also be configured for wireless communication. The second interface may be a Wi-Fi interface. The second NIC 22 may be configured for communication according to the IEEE 802.11p standard, for example. The second NIC 22 may be configured for communication according to another wireless standard suitable for performing P2P communication. The second interface may be configured for operation according to a standard of the IEEE 802.15 standard family. However, it will be appreciated that the concepts of the present invention may be implemented with any technology, standard and protocol used by the mobile entities for communication in an ad-hoc P2P network. The concepts are not limited to any such technology, standard and protocol for operation of the second interface of the mobile entity.

In operation, the controller 23 generated a request for content. The request is transmitted over the first interface. The request may include a second address which is assigned to the second interface of the mobile entity 20. For illustration, the request may include a MAC address of the second NIC 22 or an IP address of the second NIC 22 in an ad-hoc network, or any other identifier identifying the mobile entity in the ad hoc network. The request may include a first address which is assigned to the first interface of the mobile entity 20. The first address may be an IP address of the first NIC 21, for example. Any other identifier which identifies the mobile entity 20 in its communication with the mobile communication network may be included in the request. Any other identifier identifying the mobile entity 20 in the first mobile communication network may be used. The request may also include a content identifier for the content. The content identifier may be or may include an infohash value. The infohash value may be determined as in conventional Bittorrent. The request may have any one of a variety of formats. For illustration, the controller 23 may be configured to generate the request as a HTTP (Hypertext Transfer Protocol) request. The controller 23 may be configured to generate the request such that the IP address of its second NIC 22, e.g. the IP address of a Wi-Fi interface, is included in the IP-field of the HTTP request.

In response to transmitting the request for content, a message is received at the first interface. The controller 23 processes the message. The message may include a source address of a content source which is to be contacted over the mobile communication network. The message may alternatively or additionally include any other source address or seed which allows content to be retrieved over the mobile communication network. For illustration, the message may include an identifier of a peer entity which can be contacted over the mobile communication network. This allows the requesting mobile entity to retrieve the content over the mobile communication network. Second addresses of other mobile entities may selectively be included in the message, in order to direct the mobile entities to distribute the content over an ad-hoc network. If the message includes only a source address identifying the content source which is to be contacted over the mobile communication network, or any other source address for retrieving content over the mobile communication network, the controller 23 retrieves the requested content from the content source over the mobile communication network.

If the message includes one or several second addresses of other mobile entities, the controller 23 retrieves content over the second interface or redistributes content over the second interface. In this case, the second addresses of other mobile entities are used in the communication over the second interface. For the second addresses included in the message, the controller 23 knows that the associated mobile entities participate in sharing the requested content and are located in the same region as the requesting mobile entity. This allows the MANET to be established quickly and/or to be used quickly for distribution of content. If the message includes second addresses of other mobile entities, the source address of the content source which is to be contacted over the mobile communication network may additionally also be included in the message. Any other source address, such as addresses of peer entities which may be contacted over the mobile communication network, may be included in the message. The addresses may be addresses used by the peer entities in communication over the mobile communication network. The source address may be used as a fallback variant. At least one of the mobile entities in the MANET will continue to receive content from the content source over the mobile communication network The mobile entity 20 may include additional components. The mobile entity 20 may include a storage unit coupled to the controller 23. Retrieved content may be stored in the storage unit. When a message received in response to a request for content includes second addresses of other mobile entities, the controller 23 may also redistribute content stored in the storage unit to one or several of these other mobile entities. The controller 23 may generate a transmission message which is addressed to one of the second addresses indicated in the response received at the first interface. The transmission message may include at least pieces of the content stored in the storage unit of the mobile entity 20.

The mobile entity 20 may also comprise a user interface over which retrieved content is output. The mobile entity 20 may comprise an audio interface over which retrieved audio content is output. The mobile entity 20 may additionally or alternatively comprise a display to output retrieved video or image data.

The controller 23 may include a processor or plural processors. The processor may execute a computer-executable instruction code to perform the operation described herein. The computer-executable instruction code may be stored in a storage unit of the mobile entity 20, to which the controller 23 is coupled.

While the configuration of mobile entity has been explained in the context of mobile entity 20, the various other referred to herein mobile entities, such as mobile entities 25-27 and 36-41 illustrated in FIGS. 1 and 2, may also be configured as explained with reference to FIG. 3.

Figure 4:
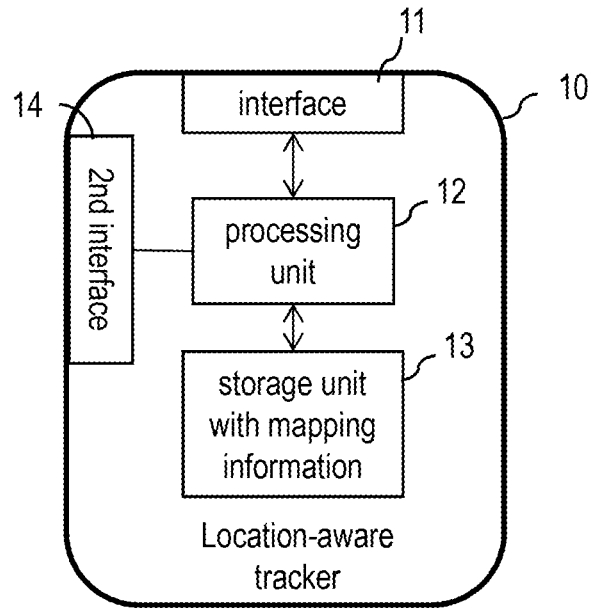
FIG. 4 is a block diagram of a device for managing distribution of content of an embodiment.

FIG. 4 is a schematic block diagram representation of a device for managing the distribution of content. The device may be configured as a location-aware tracker 10. The location-aware tracker 10 may be used in the system 1. The location-aware tracker may be a server which is configured for the operation described in more detail herein.

The location-aware tracker 10 is configured to identify, in response to receiving a request for content, mobile entities which participate in sharing the same content and which are located in the same region as the requesting mobile entity. The location-aware tracker 10 may interface with other devices to perform this operation. For illustration, the location-aware tracker 10 may interface with a geo information source to retrieve information on regions in which mobile entities are located. The location-aware tracker 10 may be configured to directly monitor which mobile entity requests which specific content. In another implementation, the location-aware tracker 10 may retrieve information on which other mobile entities participate in sharing the same specific content from an external device. For illustration, the location-aware tracker 10 may interface with a conventional tracker which does not utilize location information. The location-aware tracker 10 may act as a proxy server to the conventional tracker.

The location-aware tracker 10 includes an interface 11 and a processing unit 12 coupled to the interface. The processing unit 12 may include one or plural processors. The one or plural processors may execute instructions to perform the various acts described in the following. The interface 11 may be configured to be coupled to a node of a mobile communication network.

In operation of the location-aware tracker 10, a request for content is retrieved at the interface 11. The request for content originates from a mobile entity and is communicated to the location-aware tracker 10 over the mobile communication network. The request includes a content identifier which identifies the content requested by the mobile entity. The request may also include an identifier identifying the requesting mobile entity and, in addition, a second address used by the requesting mobile entity in communication over an ad-hoc network. The identifier identifying the requesting mobile entity may be any address or other identifier used by the requesting mobile entity in communication over the mobile communication network. For illustration, the second address may be an IP address associated with a second interface of the requesting mobile entity, over which it performs P2P communication with other mobile entities.

The processing unit 12 is configured to process the request. Based on the request, the processing unit 12 may retrieve information on a region in which the requesting mobile entity is located. The information may be retrieved from a data base. The data base may be stored locally at the location-aware tracker 10. The data base may also be stored in a separate device, e.g. a geo cast enabler. In this case, the processing unit 12 may issue a location request over a second interface 14 to retrieve geo location information for the requesting mobile entity. The geo location information may have any one of a variety of formats. For illustration, the geo location information may indicate a region in which the requesting mobile entity is located. If the data base is the data base of a geo cast enabler, the geo location information may be an identifier for a tile of a geo cast service. The geo location information may also include geographic coordinates or a cell identifier. In another implementation, the request received at the interface 11 may already include geo information location of the requesting mobile entity. I.e., this information may be supplied directly by the requesting mobile entity.

The processing unit 12 is configured to identify other mobile entities which are located in the same region as the requesting mobile entity and which participate in sharing the requested content. The processing unit 12 may identify a set of mobile entities which participate in sharing the requested content, and may identify a subset of this set of mobile entities which are located in the same region. Thereby, location-based filtering is performed. If the location-aware tracker 10 performs full tracker functionalities, i.e., keeps track of the various mobile entities which are interested in a specific content, the mobile entities which participate in sharing the requested content may be identified using a local database. If the location-aware tracker 10 interfaces with a conventional tracker which keeps track of the various mobile entities which share the specific content, the processing unit 12 may generate a request for information on mobile entities which share the requested content. The request may be transmitted to the conventional tracker, which returns identifiers for all or some of the other mobile entities which participate in sharing the requested content. The processing unit 12 may retrieve location information for the set of mobile entities which participate in sharing the requested content by querying a geo information source or by accessing a local data base, for example.

The processing unit 12 may be configured to determine whether a stable MANET can be formed in the region in which the requesting entity is located. This can be done in various ways. The processing unit 12 may be configured to perform a threshold comparison for a number of mobile entities, which are located in the same region as the requesting entity. The processing unit 12 may be configured to perform a threshold comparison for a density of mobile entities which are located in the same region as the requesting entity and which participate in sharing the requested content. Based on a result of the threshold comparison, the processing unit 12 may generate a message in which second addresses of other mobile entities which participate in sharing the content are selectively included, depending on the result of the threshold comparison. The message may be generated to include a source address of a content source from which the content may be retrieved over the mobile communication network. The source address may be included in the message irrespective of whether or not the message also contains second addresses of other mobile entities which participate in sharing the content.

More complex criteria may be used by the processing unit 12 to determine whether an ad-hoc P2P network is to be used in distributing the requested content. For illustration, a number of vehicles leaving and entering a certain region may be determined. Such quantities are available from geo cast enablers, which are notified when vehicles enter or leave tiles of a geo cast service. This information, together with information on the absolute number of vehicles in the respective region, may be indicative of a potential congestion situation in the mobile communication network. If such a potential congestion situation is identified, the processing unit 12 may take measures to alleviate the load in the affected radio cell. The processing unit 12 identifies candidates for relaying content via an ad-hoc P2P network. By transmitting a message which includes second addresses of mobile entities located in the same region as the requesting mobile entity, the requesting mobile entity is informed of suitable neighboring peers, thereby accelerating the discovery protocols and thus the IP routing.

The processing unit 12 may be configured to manage double identities of mobile entities, thereby taking account of the fact that the mobile entities respectively have a first interface and a second interface. The location-aware tracker is contacted by the requesting mobile entity using the mobile entity's first interface. The second addresses used by candidate peer mobile entities for communication over the second interface may be communicated in response to the request for content. Various measures are taken to configure the location-aware tracker 10 for managing double identities of mobile entities. For illustration, the processing unit 12 may be configured to retrieve a second address used by a requesting mobile entity in communication over an ad-hoc P2P network from the request received at the interface 11. The second address may be an IP address associated with the second interface of the requesting mobile entity. The second address may be included in the IP-field of an HTTP request. The processing unit 12 may be configured to maintain mapping information stored in a storage unit 13. The mapping information may define a mapping between identifiers of mobile entities used in communication over the mobile communication network, and second addresses of the mobile entities used in communication over the ad-hoc P2P network. When a request for content is received, the processing unit 12 may store the identifier for the mobile entity and the IP address associated with the second interface of the requesting mobile entity in the storage unit 13. If a corresponding entry is already stored in the storage unit 13, the entry may be updated.

The processing unit 12 may use the mapping information stored in the storage unit 13 in processing a request for content. For illustration, a mapping between identities which are used by mobile entities in the mobile communication network and associated second addresses used in communication in ad-hoc P2P networks may be performed when processing a request for content. The mapping may be performed when determining which mobile entities sharing the requested content are located in the same region as the requesting mobile entity. This allows location-based filtering to be performed when a conventional tracker provides information on potential peer mobile entities based on the second addresses of these mobile entities, while the geo information source provides geo location information based on the identifies which are used by mobile entities in the mobile communication network. Alternatively or additionally, the processing unit 12 may be configured to perform a mapping between identities which are used by mobile entities in the mobile communication network and associated second addresses used in ad-hoc P2P networks when generating the message transmitted to a requesting mobile entity. Thereby, the second addresses of potential peer mobile entities can be indicated in the message, even when a conventional tracker provides information on potential peer mobile entities based on the identities which are used by mobile entities in the mobile communication network. Alternatively or additionally, such a mapping may also be useful when transmitting a list of potential peer mobile entities to plural potential peer mobile entities, using a geo cast service.

Figure 5:
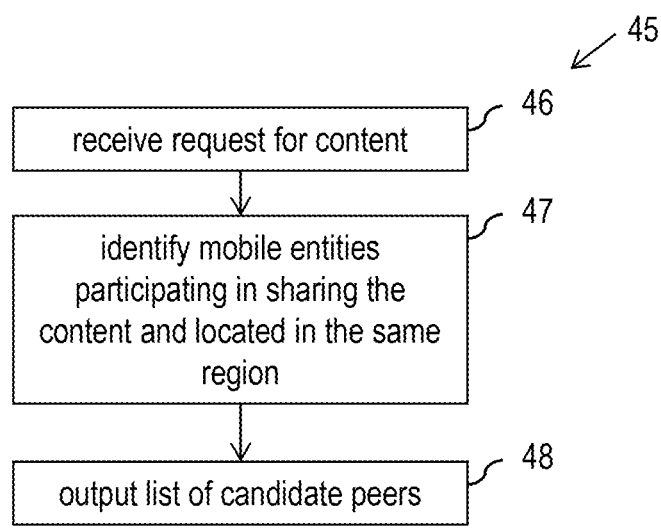
FIG. 5 is a flow diagram of a method of an embodiment.

FIG. 5 is a flow chart of a method 45 performed by a device for managing distribution of content. The method may be performed by the location-aware tracker 10.

At 46, a request for content is received. The request includes a content identifier identifying the content. The content identifier may include an infohash. The infohash may be determined in a conventional way, for example according to conventional Bittorrent procedures.

At 47, candidate peers for the requesting mobile entity are identified. This includes identifying mobile entities which participate in sharing the content over an ad-hoc P2P network and which are located in the same region as the requesting mobile entity. The identifying at 47 may be performed by filtering a list of all or some of the mobile entities which participate in sharing the requested content. The filtering may be performed based on a region in which the requesting mobile entity is located.

At 48, a list of candidate peers may be output to the requesting mobile entity. The list of candidate peers may be output in the form of a message which includes second addresses of the mobile entities identified at 47. The second addresses may be IP addresses used by the mobile entities in communication over the second interfaces, e.g. Wi-Fi interfaces. The outputting at 48 may be performed selectively based on whether the number of mobile entities identified at 47 is sufficiently large to support a stable MANET.

Figure 6:
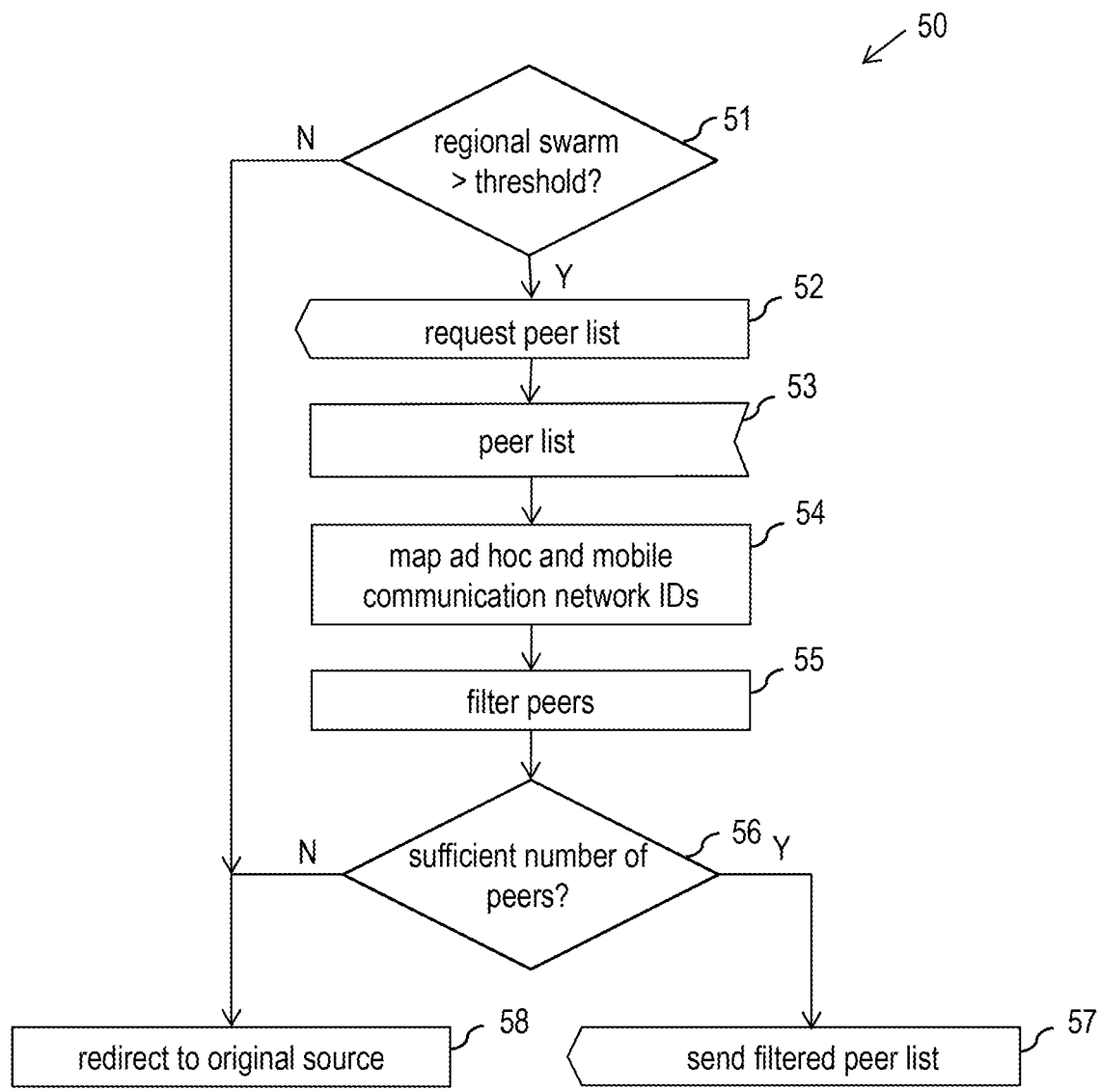
FIG. 6 is a flow diagram of a method of an embodiment.
Figure 7:
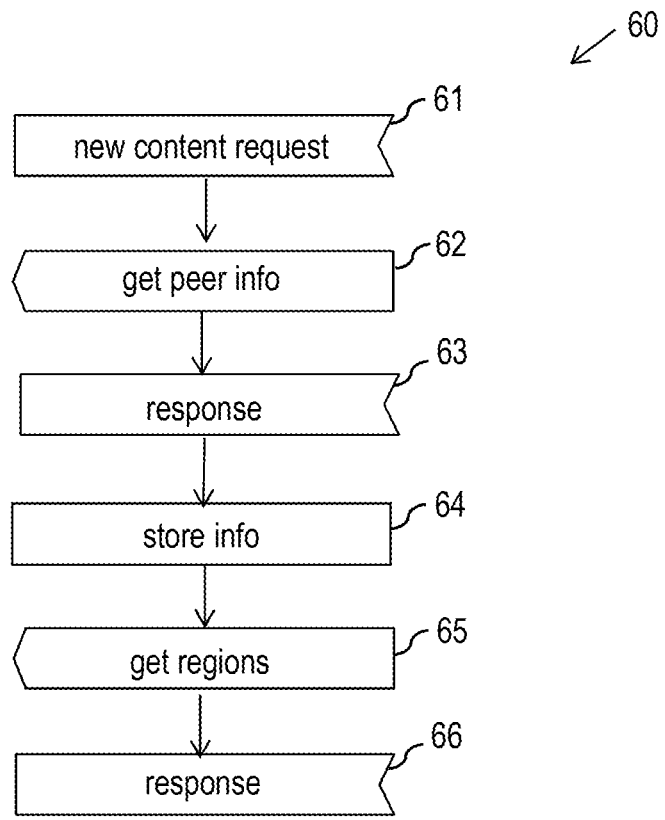
FIG. 7 is a flow diagram of a procedure which may be performed in combination with the method of FIG. 6.

FIG. 6 is a flow chart of a method 50 performed by a device for managing distribution of content. The method may be performed by the location-aware tracker 10. The method 50 may be used to implement steps 47 and 48 of the method 45. The method 50 may be performed when managing distribution of content to vehicles, e.g. cars. In this case, the location-aware tracker 10 is an ITS tracker operative to manage distribution of content to vehicles, in particular to cars. The mobile entities may be, or may be installed in, vehicles, such as cars.

Generally, the method 50 may be performed when a mobile entity which wants to download a file contacts the device for managing distribution of content. If a sufficient number of other mobile entities, i.e. peers, are in the region, the device for managing distribution of content sends back the list of peers that are present in the same region. The peers may be identified by their second addresses, e.g. by the IP addresses used in the ad-hoc P2P network. If there is no other peer in the same region, the device for managing distribution of content sends an address of a seed, i.e. a source address of a content source which can be contacted over the mobile communication network. Alternatively or additionally, the device for managing distribution of content may send a list of peer entities which can be contacted over the mobile communication network to retrieve pieces of the content.

To perform a location-based filtering, the device for managing distribution of content knows the location of the users, the users that are in a region, the users that are participating in a file sharing, and keeps a mapping between the addresses used by the peers to contact the device for managing distribution of content and the ad-hoc addresses of the respective peers. If such information is not yet available at the device for managing distribution of content, the device for managing distribution of content may retrieve the information over an interface or from a local database.

At 51, the device for managing distribution of content determines whether using an ad-hoc P2P network for distribution of content is feasible. In other words, it is determined whether the distribution may be switched to a distribution over the ad-hoc network. This decision may be based on the density of mobile entities. For illustration, the number or density of mobile entities located in the region may be compared to a threshold. A regional swarm may be defined as the peers interested in the same content in a certain region. If the density is too low, the method proceeds to 58. At 58, the seed is communicated to the user and all the pieces will be fetched from the seed. When the seed is communicated to the user, if the density is too low, based on network conditions and potentially other business criteria, a distribution mode is chosen where the peers retrieve the content over their mobile communication network connect, e.g. a 3G or LTE connection. This may be regarded as a unicast mode. In other implementations, other criteria may be used to determine whether the distribution is to be switched over to a distribution which takes advantage of an ad-hoc network in distributing the content. For illustration, a content distribution control server may trigger the process that distribution is changed over to a distribution which also uses an ad-hoc network. Alternatively or additionally, a list of peer entities which can be contacted over the mobile communication network to retrieve the content therefrom may be communicated to the requesting mobile entity at 58. When content is retrieved from peer entities over the mobile communication network, no location-based filtering must be performed.

At 52, a list of peers is requested. The request at 52 may be output to a conventional tracker which keeps track of which mobile entities participate in sharing the same content. The device for managing distribution of content may act as a Proxy to the conventional tracker.

At 53, a list of peers is received. The list may be received from a conventional tracker. The list may be a random selection of a full list of all peers which participate in sharing this same content, generated by the conventional tracker. In other implementations, the conventional tracker may provide the full list of peers which are located anywhere and which also are interested in this content.

At 54, a mapping is performed on the peer list received at 53. The mapping includes a mapping from ad-hoc to cellular addresses. I.e., if the peer list received at 53 specifies the addresses of the mobile entities which are used in the ad-hoc network, the mapping may be used to determine the identifier of the respective mobile entities used in the mobile communication network. The device for managing distribution of content may have the required mapping information stored for mobile entities which have previously transmitted a request for content to the device. The identifiers of the respective mobile entities used in the mobile communication network may be used to determine whether these mobile entities are located in the same region as the requesting mobile entity.

At 55, the peers are filtered. The filtering may be based on the region in which the requesting entity is located. The filtering may include identifying peers included in the list received at 53, which are located in the same region as the requesting entity.

If none of the peers received at 53 exist in the data base, the method may return to 52. I.e., steps 52-55 may be repeated. The device for managing distribution of content may request a new list until all the peers are processed or the list to be sent to the requester is big enough. Steps 52-55 do not need to be repeated. Some or all of steps 52-55 may be repeated if it is not possible to retrieve the location for any of the peers included in the list received at 53. Additionally or alternatively, some or all of steps 52-55 may be repeated if it is not possible to perform the address mapping at 54 for any of the peers included in the list received at 53. Thereby, information on a greater number of peers may be retrieved. It is not required that some or all of steps 52-55 are performed several times. For illustration, if the complete list of all peers is already provided at 52, the method may proceed directly to 56, without steps 52-55 being repeated.

At 56, it is determined whether there is a sufficient number of peers. It may be determined whether the number of peers is sufficient to form a stable ad-hoc network for use in distributing the content. Depending on whether the number of peers is too low, the method proceeds to 58 or 57. At 58, if the number of peers is too low to use the ad-hoc network in distributing content, the seed is communicated to the user and all the content will be fetched from the seed. This may be done, for example, if no suitable peer exists in the data base. The seed may be the source address of the content source from which the content can be retrieved over the mobile communication network. The seed may be known to the device for managing distribution of content in advance. Otherwise, the seed may be retrieved when required. Alternatively or additionally, any other source address may be included in the message which allows the content to be retrieved over the mobile communication network. For illustration, a list of peer entities which can be contacted over the mobile communication network to retrieve the content therefrom may be communicated to the requesting mobile entity at 58. When content is retrieved from peer entities over the mobile communication network, no location-based filtering must be performed.

If there is a sufficient number of peers, the method proceeds at 57. At 57, the filtered list of peers may be sent to the requesting mobile entity. The filtered list of peers may include the addresses used by the peers in communication in the ad-hoc P2P network. This may be done, for example, if there is at least one peer in the filtered list of peers. The device for managing distribution of the content may perform an address mapping to transmit the addresses used by the peers in communication in the ad-hoc P2P network to the requesting mobile entity. The filtered list of peers may be sent not only to the requesting mobile entity, but also to other mobile entities which are located in the same region as the requesting mobile entity. For illustration, the device for managing distribution of content may contact a geo cast service to initiate transmission of the list of potential peers located in the same region to all potential peers. The ad-hoc address of the requesting mobile entity may also be included in the list. Address mapping may be performed to identify the addresses used by the mobile entities in the mobile communication network, when required to initiate the transmission at 57.

The method 50 may be repeated. For illustration, the method 50 may be repeated when a new request for content is received. Execution of the method 50 may also be triggered by other events. For illustration, the method 50 may be triggered based on a threshold comparison of the number of entities located in a certain region. The method 50 may be triggered by evaluating a condition which depends on the number of mobile entities which enter and leave a certain region. This, in combination with the absolute number of mobile entities in the respective region, may allow a content distribution over the ad-hoc network to be initiated before a congestion situation occurs in the mobile communication network. This may be beneficial in terms of quality of experience.

The method 50 may be performed in combination with additional procedures. For illustration, in an implementation, additional processing may be performed to retrieve all required information on the requesting peer and/or to determine the region(s) in which the requesting peer is located.

FIG. 6 is a flow chat of a procedure 60. In an embodiment, a method may include the procedure 60 which may be performed in combination with the method 50 of FIG. 5. The procedure 60 may be performed before step 51 is performed. Receipt of a new request for content, which is processed using the procedure 60, may trigger the method 50 of FIG. 5.

At 61, a new request for content is received. The request may include a content identifier identifying the requested content.

At 62, a request for information on the requesting peer is output. The request may be output to a node of a mobile communication network and/or may be transmitted to the requesting peer.

At 63, a response including information on the peer is received. The response may include geo location information of the peer. The geo location information may be in the form of a GPS (Global Positioning System) position. The response may include a cell identifier of a cell. The response may include an identifier for the peer which the peer uses in the ad-hoc network. The response may include additional information, such as a heading or a SSID (Service Set Identifier).

At 64, the received information is stored.

At 65, a message is transmitted to receive information on the region(s) in which the peer is located. The request may include information on the location of the peer. Additionally or alternatively, the request may include information on a cell in which the peer is located. In the present context of using ad-hoc P2P networks for distributing content, the region may be seen as a notion similar to the tile notion in the geo cast enabler. The region may be larger than a tile of a geo cast service, which allows a geo cast service to provide more fine grained info. A region may be identified as a union of a certain number of adjacent cells of the mobile communication network. Regions may overlap, and then a cell may belong to different regions. The requesting peer may thus be located in one or plural regions.

At 66, a response is receives. The response indicated the region(s) in which the requesting peer is located, determined based on the location and/or cell identifier included in the message transmitted at 65.

The method may then continue at 51, as described with reference to FIG. 5.

Figure 8:
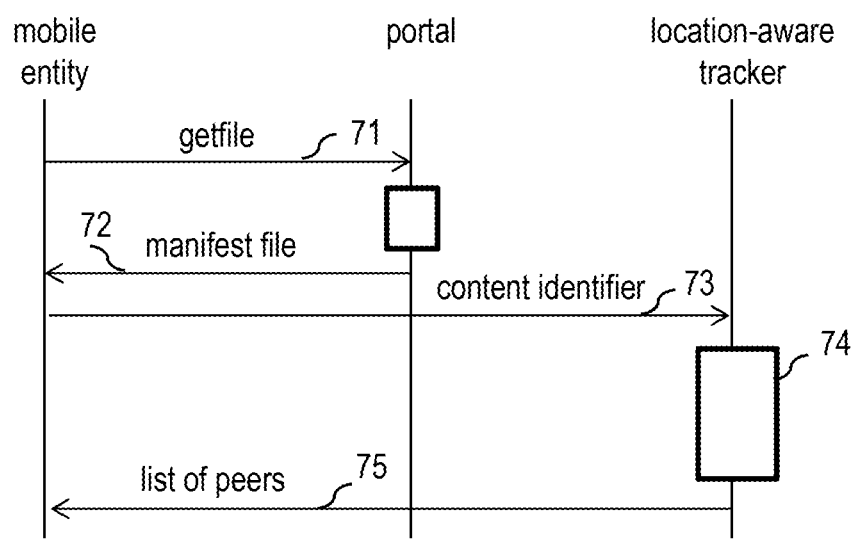
FIG. 8 is a diagram illustrating signal flow in a method of an embodiment.

FIG. 8 is a schematic view illustrating a signal flow according to embodiments. A device for managing distribution of content, which is configured as a location-aware tracker, provides a list of mobile entities which participate in sharing the content requested by the requesting mobile entity. The mobile entities may be vehicles or may be integrated into vehicles. In this case, the location-aware tracker may act as an ITS tracker, operative in managing distribution of content for an ITS. When the location-aware tracker is operative to manage distribution of content for an ITS, it may also be referred to as ITS tracker. A signal flow as illustrated in FIG. 8 can result when a mobile entity wants to receive real-world images for navigation purposes, for example. It will be assumed that the ad-hoc network has been established in advance. This may frequently be the case, for example when safety messages are supposed to be sent on the ad-hoc network. Otherwise, the ad-hoc network may be established specifically for distributing content.

The mobile entity transmits a getfile message 71 to a portal. The portal may be a navigation portal when the getfile message 71 is transmitted to request a new real-world image. The getfile message 71 may be transmitted to a different portal if different content is requested.

The portal sends backs a manifest file 72. The manifest file 72 may be a torrent file. The manifest file 72 may have information on the tracker which is to be contacted. The manifest file 72 does not point to a conventional tracker, but points to a location-aware tracker. The location-aware tracker may be configured according to any one of the various embodiments described herein. The location-aware tracker performs a processing which takes into account that relative positions matter when content is to be distributed over second interfaces in a MANET.

The mobile entity transmits a request 73 to contact the location-aware tracker mentioned in the manifest file 72. The request 73 may be sent at the reception of the manifest file 72. Transmission of the request 73 may include transmission of an infohash. The location-aware tracker may be indicated in the "tracker"-field of the manifest file 72. Prior to sending the request 73, the mobile entity may calculate the infohash. The infohash may be calculated in a manner identical to conventional Bittorrent schemes. When generating the request 73, the mobile entity may generate the request 73 as a HTTP request. The mobile entity may include an address associated with its second interface in the request 73. For illustration, the "IP"-field may be used to communicate the IP address of the second interface, i.e. the address in the ad-hoc network. Additional information, such as the SSID, may also be included in the request. The request may be an HTTP request of the type http://some.tracker.com:999/
announce?info_hash=12345678901234567890&peer_id=ABCDEFGHIJKLMNOPQRST&ip=255.255.255.255&port=6881&downloaded=1234&left=98765&event=stopped. Fields may be added as required. This applies even if such fields are not used in conventional Bittorrent schemes. For illustration, a field may be included in the request 73 to indicate the location of the mobile entity. Such a field may have the form &location=52.15,6.08, indicating geo coordinates of the requesting mobile entity.

The location-aware tracker performs processing 74 of the request. In the processing 74, the location-aware tracker identifies a list of peers which participate in sharing the requested content and are located in the same region as the requesting mobile entity. The processing performed at 74 may include the method 50 of FIG. 5. The processing performed at 74 may also include some or all steps of the procedure 60 of FIG. 6.

The location-aware tracker transmits a message 75 which includes the list of peers. The subsequent usage of the list of peers indicated in the message 75 may correspond to a conventional file sharing. For illustration, Bittorrent exchange may be used.

All messages 71, 72, 73 and 75 are transmitted over the mobile communication network. These messages are transmitted or received over the first interface of the mobile entity.

Figure 9:
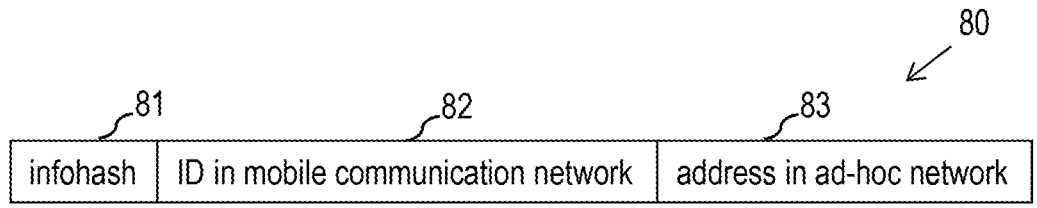
FIG. 9 is a schematic representation of a request transmitted by a mobile entity and received by a device for managing distribution of content of an embodiment.

FIG. 9 is a schematic view of data 80 which may be included in a request transmitted from the mobile entity to the location-aware tracker. The data 80 may include a field 81 which contains an infohash. The data may include another field 82 which contains an identifier of the mobile entity, which is used for communication in the mobile communication network. The identifier of the mobile entity, which is used for communication in the mobile communication network, may also be implicitly discovered as this identifier may be used to establish communication with the tracker. The data 80 does not need to explicitly include the identifier of the mobile entity, which is used for communication in the mobile communication network. The field 82 may be omitted. The data may include yet another field 83 which contains an address of the mobile entity, which is used for communication in the ad-hoc P2P network. The data in fields 82, 83 relates to the two different identities of the mobile entity in the mobile communication network and in the ad-hoc network, respectively. This allows a location-aware tracker to manage these double identities.

The location-aware tracker may be interfaced with various servers and/or nodes to retrieve all information required for identifying mobile entities which participate in sharing the same content and which are located in the same region. This will be illustrated further with reference to FIG. 10.

Figure 10:
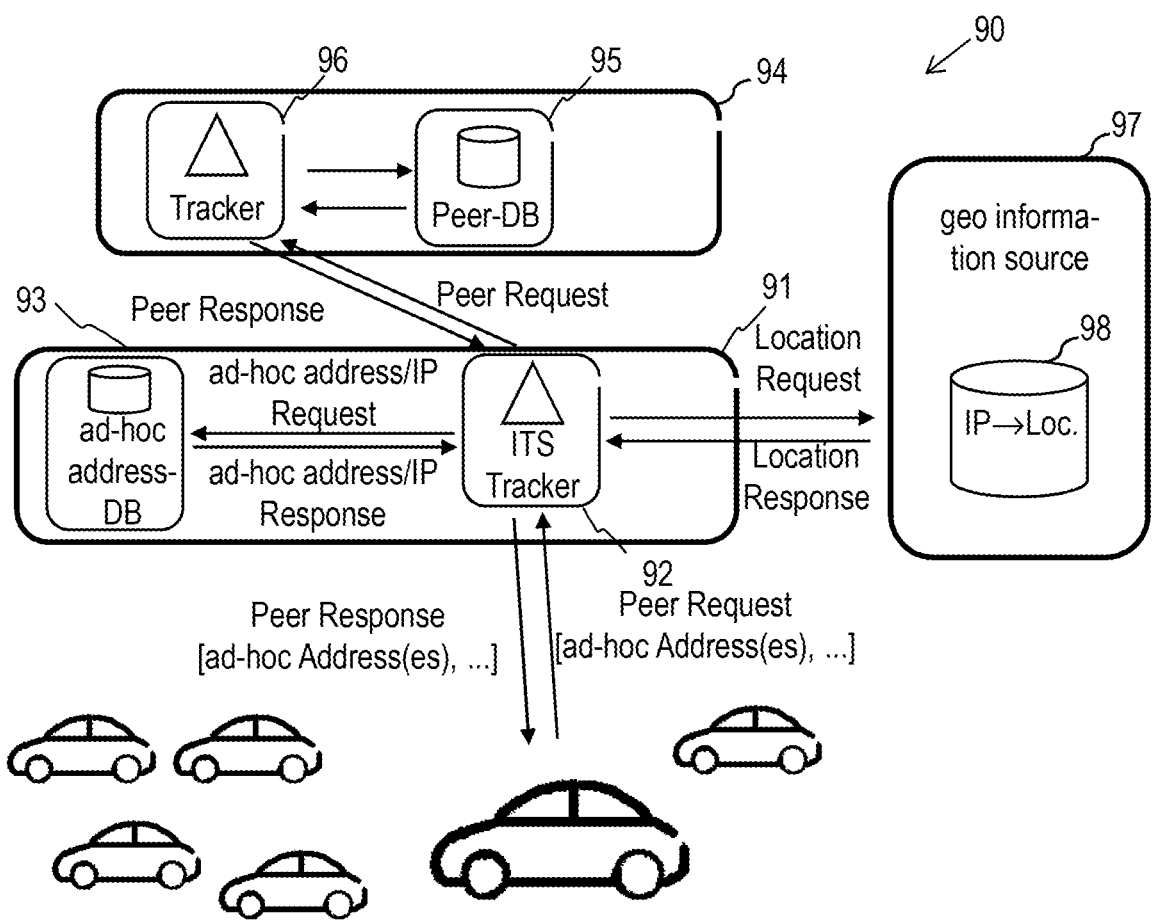
FIG. 10 is a schematic illustration of a system comprising mobile entities and a device for managing distribution of content of an embodiment, for explaining the operation of the various entities.

FIG. 10 is a schematic view showing a system 90. The system 90 comprises a device 91 for managing distribution of content according to an embodiment. The system 90 comprises mobile entities which respectively have a first interface and a second interface. Each one of the mobile entities may be respectively be configured as explained with reference to FIG. 5.

The device 91 for managing distribution of content is interfaced with a system 94 which provides information on potential peers, without performing any location-dependent filtering. The device 91 for managing distribution of content is also interfaced with a geo information source 97 which is configured to provide geo location information for mobile entities. The device 91 for managing distribution of content may be interfaced with at least one other node of the mobile communication network (not shown in FIG. 10), to receive requests for information and to transmit messages including information on other mobile entities which are located in the same region.

The device 91 for managing distribution of content may include an ITS tracker 92. The ITS tracker 92 may perform the functions of the location-aware tracker, used to manage the distribution of content to vehicles. The device 91 for managing distribution of content may include a mapping data base 93. The mapping data base 93 may store information which may be used in mapping the two identities of a mobile entity onto each other. For illustration, the ITS tracker 92 may access the mapping data base 93 to determine the identifier of a given mobile entity in the mobile communication network based on the IP or MAC address of the Wi-Fi interface of this mobile entity, or vice versa. The ITS tracker 92 may update the data in the mapping data base 93 in response to receiving a request for content.

The geo information source 97 may include a location data base 98. The geo information source 97 may be a server of a geo cast service, for example. The geo information source 97 may be a geo cast enabler. The location data base 98 may store information which may be used in determining the region in which mobile entities are located. For illustration, the location data base 98 may store information which associates identifiers for mobile entities with respectively a region. The location data base 98 may also store more fine grained information. For illustration, if the geo information source 97 is a geo cast enabler, the location data base 98 may store the geo cast tile(s) in which mobile entities are located. Based on the geo cast tile(s), the regions used in embodiments may be determined to establish whether mobile entities are located in proximity to each other.

The system 94 which provides information on potential peers may include a conventional tracker 96 and a peer data base 95 of peers. In response to a peer request from the ITS tracker 92, the tracker 96 queries the peer data base 95. The tracker 96 returns a peer response which includes a list of peers interested in the same content as indicated by the peer request. The list of peers returned to the ITS tracker 92 is not yet filtered based on location.

In operation of the system 90, the ITS tracker 92 receives a peer request from a mobile entity. The peer request may include identifiers for the mobile entity in the mobile communication network and in the ad-hoc network. The ITS tracker 92 may perform the processing explained with reference to FIGS. 5-8 above. The ITS tracker 92 may retrieve geo location information on locations and/or on the regions at which mobile entities are located from the geo information source 97. The ITS tracker may retrieve mapping information for managing the two identities of the mobile entities from the mapping data base 93. The ITS tracker 92 may process this information to determine the list of mobile entities which are located in the same region and which share the same content. The ITS tracker 92 may return a corresponding list of peers, filtered based on location, to one or several of the mobile entities.

Figure 11:
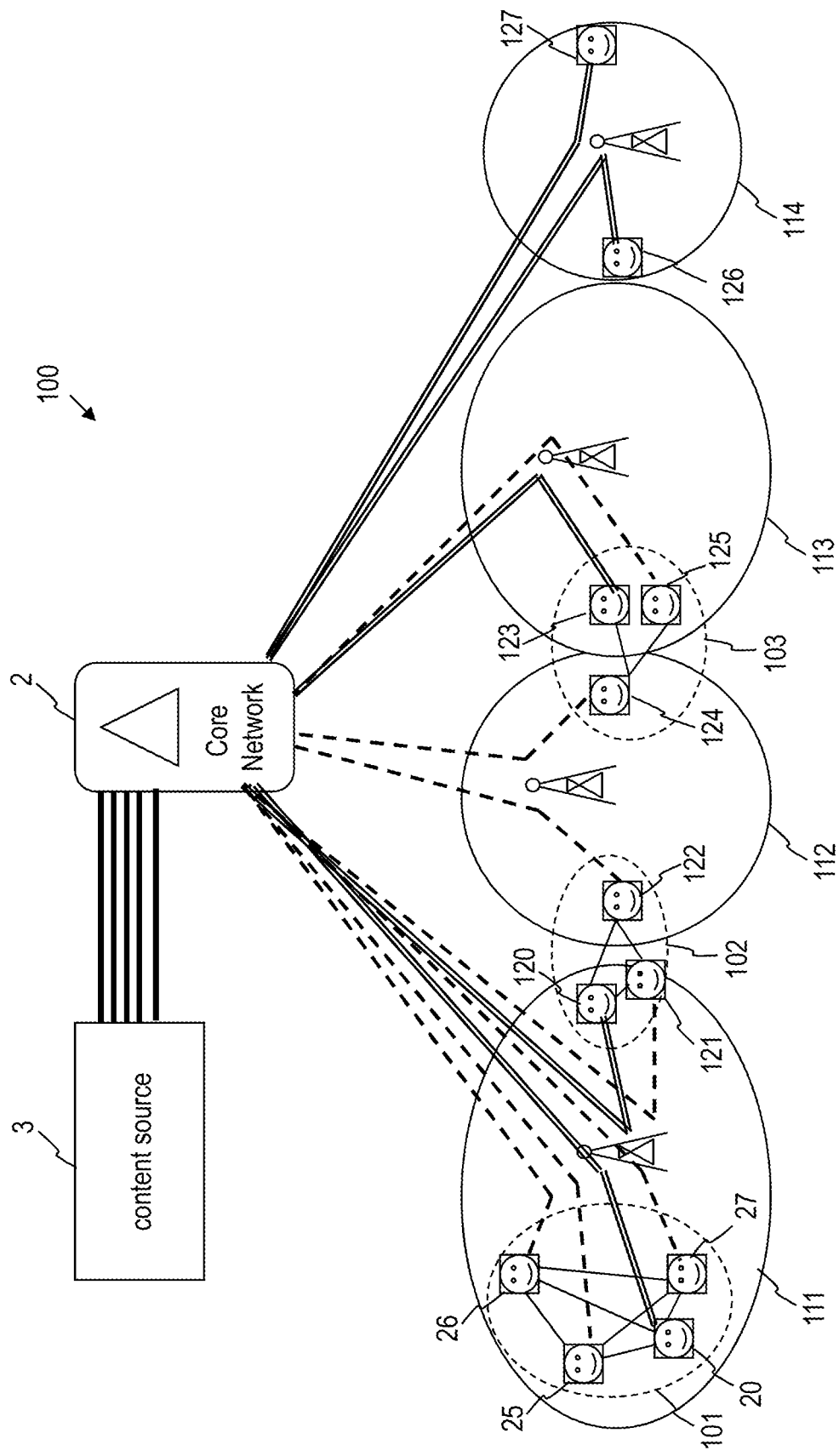
FIG. 11 is a schematic illustration for explaining content delivery according to a method of an embodiment.
Figure 12:
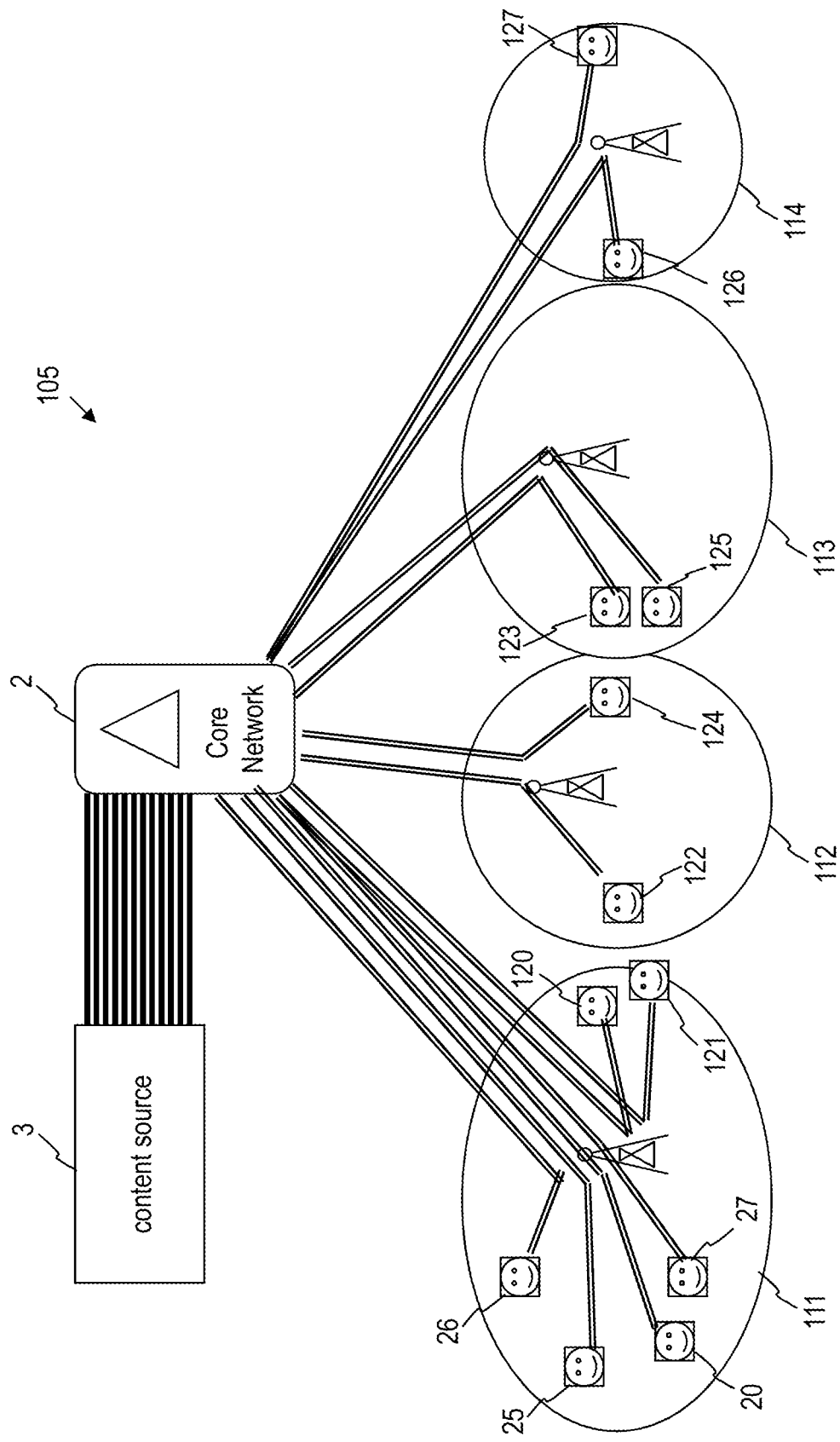
FIG. 12 is a schematic illustration for explaining content delivery which does not take advantage of distribution of content via a second interface of mobile entities.

FIGS. 11 and 12 illustrate content delivery to mobile entities 20, 25-27, 120-127 of a mobile communication network. The mobile entities may be vehicles or may be installed in vehicles. The mobile entities may be configured as explained with reference to FIG. 3. FIG. 11 shows a situation in which content is distributed also over ad-hoc P2P networks, using methods or devices of embodiments. FIG. 12 shows a situation in which each mobile entity retrieves the content over the mobile communication network. In FIGS. 11 and 12, solid double lines represent communication channels in which content is transmitted over the mobile communication network. Broken lines represent communication channels which are not used for delivering content to mobile entities.

FIG. 11 is a schematic view of a mobile communication network 100. The mobile communication network 100 has several cells 111-114. Plural ad-hoc P2P networks 101-103 are formed. A first ad-hoc P2P network 101 is formed among the mobile entities 20, 25-27. The first mobile entity 20 receives the content from the content source 3 over a node of the core network 2 of the mobile communication network. The first mobile entity 20 redistributes the received content to other mobile entities 25-27, which are peers of the first mobile entity 20 in the first ad-hoc P2P network 101. A second ad-hoc P2P network 102 is formed among the mobile entities 120-122. The first mobile entity 120 receives the content from the content source 3 over a node of the core network 2 of the mobile communication network. The second ad-hoc P2P network 102 extends across a boundary between a first cell 111 and a second cell 112 of the mobile communication network. A second mobile entity 122 of the second ad-hoc P2P network 102 is located in a second cell 112 of the mobile communication network, but may receive the content from the first mobile entity 120 located in the first cell 111. Distribution of content in an ad-hoc P2P network may extend across boundaries of cells of the mobile communication network. Similarly, a third ad-hoc P2P network 103 is formed between mobile entities 123-125. The third ad-hoc P2P network 103 also extends across the boundary between cells of the mobile communication network. Content may be delivered to one or several mobile entities located in a cell of the mobile communication network, without any load being added on the RAN (radio access network) for the respective cell. This is the case, for example, for cell 112 in FIG. 11.

In some regions, it may be required to deliver content to plural mobile entities located in a cell. For illustration, the two mobile entities 126, 127 located in cell 114 may not be sufficient to support content distribution over a stable MANET. The two mobile entities 126, 127 receive the content over the mobile communication network.

FIG. 12 shows the content distribution in the mobile communication network 105 when mobile ad-hoc P2P networks are not used for content distribution. The load on the mobile communication network increases, leading to a potential congestion situation in the mobile communication network. Using ad-hoc P2P networks for the distribution of the content helps to reduce the load in the mobile communication network.

It is to be understood that the examples and embodiments as explained above are merely illustrative and susceptible to various modifications. For illustration, in each embodiment and aspect described herein, the mobile entities may be vehicles. The mobile entities may be cars. Methods, devices and systems of embodiments are not limited thereto and may also be used for other mobile entities of mobile communication networks. The mobile entities may be handheld devices, such as mobile phones, which have a first interface for communication via the mobile communication network and a second interface for communication with each other in an ad-hoc P2P network. The second interface of the handheld devices may be configured for operation according to a standard of the IEEE 802.11 standard family. The second interface of the handheld devices may be a Wi-Fi interface. The second interface of the handheld devices may be configured for operation according to a standard of the IEEE 802.15 standard family. The concepts of the invention may be implemented with any technology, standard and protocol used by the mobile entities for communication in an ad-hoc P2P network. The concepts are not limited to any such technology, standard and protocol for operation of the second interfaces. The location-aware tracker may be an ITS tracker for use in an ITS. For further illustration, in each embodiment and aspect described herein, the content delivery may be live audio streaming, live video streaming, or audio and/or video streaming on demand. Methods, devices and systems of embodiments are not limited thereto and may also be used for both live and on-demand content delivery, as well as streaming and download content delivery. For further illustration, in each embodiment and aspect described herein, a source address communicated to a requesting mobile entity for content retrieval over the mobile communication network may indicate a content server, but may additionally or alternatively also indicate one or plural peer entities from which the requested content may be retrieved over the mobile communication network. If a list of peer entities is transmitted to a requesting mobile entity so as to allow the requesting mobile entity to retrieve at least pieces of the requested content over the mobile communication network from the peer entities, no location-based filtering must be performed for generating this list. For further illustration, more than one or even all mobile entities that form an ad-hoc P2P network may receive pieces of the requested content from the content source over the mobile communication network. Different mobile entities in one and the same ad-hoc P2P network may receive different pieces of a specific content over the mobile communication network, and may share the different pieces with each other. Further, it is to be understood that the above concepts may be implemented by using correspondingly designed software to be executed by a processor of an existing device, or by using dedicated device hardware.

The invention claimed is:

1. A method of managing distribution of content to a mobile entity, the mobile entity having a first interface for communicating with a mobile communication network and a second interface for forming an ad-hoc network with another mobile entity, the method comprising:
receiving, over an access point of the mobile communication network, a request from the mobile entity, the request including a content identifier identifying the content;
determining, based on the received request, a region in which the mobile entity is located;
establishing a density of mobile entities in the determined region and comparing the density to a threshold;
responsive to the threshold comparison, selectively:
retrieving, based on the content identifier, information on other mobile entities which participate in sharing the content;
identifying a subset of the other mobile entities based on the determined region; and
transmitting, via an access point of the mobile communication network, a message to the mobile entity, the message including a peer address of a peer mobile entity included in the identified subset or a source address, the peer address allowing the mobile entity to form an ad-hoc network with the peer mobile entity via the second interface and to retrieve at least a piece of the content from the peer mobile entity over the ad-hoc network, wherein the ad-hoc network comprises an infrastructure-less network that is distinct from the mobile communication network; and
monitoring, for a plurality of regions, a number of mobile entities located in the respective region to predict a congestion in a radio network;
wherein the comparing the density to a threshold predicts congestion in the radio network; and
wherein the retrieving and the identifying are selectively performed based on the-predicted congestion.

2. The method of claim 1 wherein the selectively retrieving comprising retrieving location information for the other mobile entities, wherein the selectively identifying comprises identifying the subset based on the retrieved location information and the determined region.

3. The method of claim 2 further comprising:
verifying, based on the retrieved location information, whether a stability criterion for forming the ad-hoc network is fulfilled; and
selectively including, based on the verifying, the peer address in the message to switch to a distribution of the content over the ad-hoc network.

4. The method of claim 3 wherein the verifying comprises:
determining a density of mobile entities which participate in sharing the content in the determined region; and
determining the stability criterion is fulfilled based on the size of the density of mobile entities which participate in sharing the content in the determined region.

5. The method of claim 1 further comprising maintaining mapping information defining a mapping between first addresses used in the mobile communication network and second addresses used in the ad-hoc network.

6. The method of claim 1 further comprising:
the mobile entity receiving the message;
the mobile entity fetching, in response to the message including the peer address, at least a piece of the content from the peer mobile entity via the ad-hoc network.

7. The method of claim 1, wherein the method further comprises:
determining a density of mobile entities which participate in sharing the content in the determined region; and
selectively including, based on the determined density of mobile entities which participate in sharing the content in the determined region, the peer address in the message to switch to a distribution of content over the ad-hoc network.

8. The method of claim 1, wherein the determined region extends across the boundary of a cell of the access point.

9. A method of retrieving content by a mobile entity which has a first interface for communicating with a mobile communication network and a second interface for forming an ad-hoc network with another mobile entity, the method comprising:

transmitting, over the first interface towards an access point of the mobile communication network, a request including a content identifier identifying the content;

responsive to the density of mobile entities in a region comprising the mobile entity exceeding a threshold, receiving over the first interface, in response to the request, a message including a peer address;

processing the message received over the first interface;

selectively, in response to the message including the peer address and using the peer address, forming an ad-hoc network with another mobile entity via the second interface and retrieving at least a piece of the content from said another mobile entity over the ad-hoc network, wherein the ad-hoc network comprise an infrastructure-less network that is distinct from the mobile communication network; and wherein the message further includes a source address, and wherein the method further comprises, in a fallback procedure, retrieving content over the first interface using the source address in response to an unsuccessful attempt to retrieve at least a piece of content from one or more mobile entities in an identified subset.

10. The method of claim 9, wherein the region comprising the mobile entity extends across the boundary of a cell of the access point.

11. A device for managing distribution of content to a mobile entity, the device comprising:

an interface to receive over an access point of a mobile communication network, a request from the mobile entity, the request including a content identifier identifying the content;

a processing unit coupled to the interface and configured to:
determine, based on the received request, a region in which the mobile entity is located;
establish a density of mobile entities in the determined region and comparing the density to a threshold;
responsive to the threshold comparison, selectively:
retrieve, based on the content identifier, information on other mobile entities which participate in sharing the content;
identify a subset of the other mobile entities based on the determined region; and
transmit, via an access point of the mobile communication network, a message to the mobile entity, the message including a peer address of a peer mobile entity included in the identified subset or a source address, the peer address allowing the mobile entity to form an ad-hoc network with the peer mobile entity via the second interface and to retrieve at least a piece of the content from the peer mobile entity over the ad-hoc network, wherein the ad-hoc network comprises an infrastructure-less network that is distinct from the mobile communication network; and
monitor, for a plurality of regions, a number of mobile entities located in the respective region to predict a congestion in a radio network;
wherein the comparing the density to a threshold predicts congestion in the radio network; and
wherein the retrieving and the identifying are selectively performed based on the predicted congestion.

12. The device of claim 11 wherein the processing unit is further configured to:
retrieve location information on other mobile entities by retrieving location information for the other mobile entities; and
identify the subset by identifying a subset based on the retrieved location information and the determined region.

13. The device of claim 12 wherein the processing unit is further configured to:
verify, based on the retrieved location information, whether a stability criterion for forming the ad-hoc network is fulfilled; and
selectively include, based on the verifying indicating that the stability criterion is fulfilled, at least one peer address in the message.

14. The device of claim 13 wherein the processing unit is further configured to verify whether the stability criterion is fulfilled by:
determining a density of mobile entities which participate in sharing the content in the determined region; and
determining the stability criterion is fulfilled based on the size of the density of mobile entities which participate in sharing the content in the determined region.

15. A mobile entity, comprising:
a first interface for communicating with a mobile communication network;
a second interface for forming an ad-hoc network with another mobile entity;
a controller configured to:
transmit, over the first interface towards an access point of the mobile communication network, a request including a content identifier identifying the content;
responsive to the density of mobile entities in a region comprising the mobile entity exceeding a threshold, receive over the first interface, in response to the request, a message including a peer address;
process the message received over the first interface;
selectively, in response to the message including the peer address and using the peer address, form an ad-hoc network with another mobile entity via the second interface and retrieving at least a piece of the content over the second interface from said another mobile entity over the ad-hoc network, using the peer address wherein the ad-hoc network comprise an infrastructure-less network that is distinct from the mobile communication network; and
wherein the received message includes both a source address and a peer address, and wherein the controller is further configured to, in a fallback procedure, retrieve content over the first interface using the source address in response to an unsuccessful attempt to retrieve at least a piece of content from one or more mobile entities in an identified subset.

16. The mobile entity of claim 15 wherein content exchanged over the second interface is via one of a Wi-Fi, Bluetooth, personal area network (PAN), or wireless access in vehicular environments (WAVE) standard.

17. The mobile entity of claim 15,
wherein the mobile entity is mobile via a vehicle located within one cell, and the peer mobile entity is mobile via a vehicle located in another cell; and
wherein the controller is further configured to switch from retrieving the content over the first interface to retrieving the content over the second interface based on the physical proximity of the peer mobile entity to the mobile entity in the determined region.

* * * * *

UNITED STATES PATENT AND TRADEMARK OFFICE
CERTIFICATE OF CORRECTION

PATENT NO. : 11,197,140 B2
APPLICATION NO. : 15/610824
DATED : December 7, 2021
INVENTOR(S) : El Khayat et al.

It is certified that error appears in the above-identified patent and that said Letters Patent is hereby corrected as shown below:

On the Title Page

On Page 2, item (56), under "U.S. PATENT DOCUMENTS", in Column 2, Line 1, delete "Rimae" and insert -- Rimac --, therefor.

In the Specification

In Column 1, Line 7, delete "2012," and insert -- 2012, now patent no. 9,699,592, --, therefor.

In Column 11, Line 53, delete "real-word" and insert -- real-world --, therefor.

In Column 20, Line 58, delete "flow chat" and insert -- flow chart --, therefor.

In the Claims

In Column 26, Line 25, in Claim 1, delete "the-predicted" and insert -- the predicted --, therefor.

Signed and Sealed this
Nineteenth Day of April, 2022

Katherine Kelly Vidal
*Director of the United States Patent and Trademark Office*